US012762923B2

(12) United States Patent
Weaver et al.

(10) Patent No.: US 12,762,923 B2
(45) Date of Patent: Oct. 13, 2026

(54) INTELLIGENT ELECTRONIC PULL-TAB SYSTEM AND METHOD

(71) Applicant: Pilot Games, Inc., Minnetonka, MN (US)

(72) Inventors: Jon Weaver, Saint Paul, MN (US); Anthony M. Morelli, Mt. Pleasant, SC (US)

(73) Assignee: Pilot Games, Inc., Minnetonka, MN (US)

( * ) Notice: Subject to any disclaimer, the term of this patent is extended or adjusted under 35 U.S.C. 154(b) by 553 days.

(21) Appl. No.: 18/124,471

(22) Filed: Mar. 21, 2023

(65) Prior Publication Data

US 2024/0321036 A1 Sep. 26, 2024

(51) Int. Cl.
*G07F 17/32* (2006.01)

(52) U.S. Cl.
CPC ...... *G07F 17/3211* (2013.01); *G07F 17/3225* (2013.01); *G07F 17/329* (2013.01)

(58) Field of Classification Search
CPC . G07F 17/3211; G07F 17/3225; G07F 17/329
See application file for complete search history.

(56) References Cited

U.S. PATENT DOCUMENTS

2002/0039923 A1 4/2002 Cannon et al.
2003/0064805 A1 4/2003 Wells
2005/0020358 A1 1/2005 Cram
2008/0254854 A1 10/2008 Slomiany et al.
2009/0286604 A1 11/2009 Clowes et al.
2011/0092276 A1 4/2011 Acres
2011/0105208 A1 5/2011 Bickley
2011/0256924 A1 10/2011 Mcghie et al.
2014/0080564 A1* 3/2014 Acres .................. G07F 17/3288 463/25
2014/0370959 A1 12/2014 Yacenda
2016/0030841 A1 2/2016 Perlman et al.
2016/0063817 A1 3/2016 Guinn
2017/0092074 A1 3/2017 Watkins et al.
2019/0143204 A1 5/2019 Aman et al.
2020/0286329 A1 9/2020 Weaver et al.
2021/0192888 A1* 6/2021 Danielson ............. G07F 17/326

* cited by examiner

*Primary Examiner* — Werner G Garner
(74) *Attorney, Agent, or Firm* — Michael A. Kerr; Kerr IP Group, LLC

(57) ABSTRACT

A system and method for generating and distributing intelligent electronic pull-tab tickets is described. The system includes a variety of gaming devices, such as a fixed gaming machine, a venue-provided mobile device, and a personal mobile device, an online account, and a network component, such as a central gaming system. A player funds the online account, and the gaming device may use the online account to purchase one or more intelligent electronic pull-tab tickets from the central gaming system. During this process, either the central gaming system or the gaming device will select a particular graphical rendering from a plurality of graphical renderings associated with a selected intelligent electronic pull-tab ticket, wherein the selected graphical rendering is further associated with a hardware profile matching the requesting game device's hardware profile.

20 Claims, 18 Drawing Sheets

100a

100b

Figure 2A
200a
WINTER WOLVES
FREEPLAYS
ADD CASH
MENU
GAME INFO
TOUCH TO CHANGE
50¢
CASH
$ 610.75
WIN
$ 0.00
OPEN

200b

200c

INTELLIGENT ELECTRONIC PULL-TAB SYSTEM AND METHOD

FIELD

A system and method for generating and distributing intelligent electronic pull-tab tickets is described. More particularly, the intelligent electronic pull-tab tickets are generated in association with a plurality of graphical rendering corresponding to various hardware profiles and distributed from a single "deck" to a plurality of gaming devices having various hardware profiles.

BACKGROUND

Typical wagering devices include slot machines and video lottery terminals and are normally managed by various types of computer systems which monitor and control their activities. Such wagering devices are typically located in casinos, racetracks, tribal gaming locations, fraternal organizations, lottery outlets or other authorized locations. These are generally capital-intensive operations requiring a significant capital expenditure.

Wagering system have been developed where a central computer system is interconnected via one or more of a variety communication mechanisms to a multiplicity of venues where wagering devices, such as VLTs or slot machines, allow players to play. The information associated with the wagering devices is transmitted to the central computer, which provides security monitoring and accounting services. Many varieties of such systems exist.

The wagering devices may operate as stand-alone wagering devices, in which the wagering activity and prize awards are handled principally by the retail device, e.g., slot machine, and the central system is tasked with monitoring and reporting activities associated with the retail device. Other stand-alone wagering devices are more highly integrated with the central system, in which the central system performs some or all of the game play and the retail device reflects the wagering results determined by the central system.

Typically, the traditional wagering devices in the retail venues are proprietary devices. More recently, central systems have been developed that use commercial digital tablets or similar mobile devices that are configured and operated at a particular venue. In some jurisdictions systems exist that allow personal mobile devices, e.g., smartphones, to be used as a wagering device that operates wagering games in various online configurations. These mobile devices and traditional wagering devices do not have uniform display screen dimensions or formats. For example, a tablet typically displays games in a landscape format, while a cabinet typically includes a large vertically oriented screen that displays games in a portrait format.

This diversity of gaming devices is intended to facilitate player engagement by increasing the number of gaming devices in an establishment, increase player mobility, and even expand the number of gaming opportunities by potentially providing gaming outside of a licensed venue. However, certain inflexibilities in gaming systems may actually result in negative player experiences when games are provided across such a diversity of gaming devices.

This disparity among gaming device display formats may negatively impact the player experience in the electronic pull-tab space where unique constraints impact the player experience. Presently, the distribution of electronic pull-tab game sessions (i.e., digital tickets) to devices with different screen sizes and/or aspect ratios may require multiple decks of electronic pull-tab tickets, e.g., one deck of electronic pull-tab tickets with 3×3 symbol grids for cabinet gaming devices and another different deck of electronic pull-tab tickets with 5×3 symbol grids for tablet gaming devices. For example, FIG. 1A shows a game display graphical rendering 100*a* of a $100.00 winning ticket for a 5×3 game grid presented as intended on a game display with a 4:3 aspect ratio, such as a tablet display. And FIG. 1B shows a game display graphical rendering 100*b* of a $100.00 winning ticket for a 3×3 game grid presented as intended on a game display with a 9:16 aspect ratio, such as a cabinet display. Though these graphical renderings are for an electronic pull-tab ticket having the same theme, wager amount, and award value, neither the symbols displayed, the winning pattern displayed, nor the background are the same for the two graphical renderings. As stated, these disparities required prior art gaming systems to utilize two decks to provides such 5×3 and 3×3 graphical renderings.

However, it is desirable to utilize a single deck of electronic pull-tab tickets for a common game theme to align with player conceptions arising from paper pull-tab tickets. Players traditionally followed the flow or rhythm of the game (i.e., pull-tab deck) by recognizing through word of mouth when top prizes in the game have been won and are no longer available. From such information, players developed strategies of play based on their perceived state of the game (i.e., pull-tab deck) and remaining available prizes. However, requiring multiple electronic pull-tab decks for a single game theme to service various gaming devices may hinder this player perception.

Prior art techniques addressed this multi-deck issue by stretching or centering game result renderings so that a single deck utilizing a single grid dimension could be used across gaming devices, regardless of screen size and format. However, while a game display with a 5-column grid may make appropriate use of a tablet's landscape display format, a 3-column grid may not. Similarly, while a game display with a 3-column grid may make appropriate use of a cabinet's portrait display format, a 5-column grid may not. For example, FIG. 2A shows a game display graphical rendering 200*a* of an illustrative electronic pull-tab ticket for a 5×3 game grid presented as intended on a game display with a 4:3 aspect ratio, such as a tablet display. In order to present this same 5×3 game grid graphical rendering on a cabinet display with a 9:16 aspect ratio, prior art techniques either stretched the image to fit, or centered the image without any stretching.

FIG. 2B shows a graphical rendering 200*b* of the 5×3 game grid stretched to fit a cabinet display with a 9:16 aspect ratio. This technique distorts every feature of the graphical rendering 200*b*, including both the symbols in the 5×3 game grid, as well as the buttons and information along the bottom of the image.

FIG. 2C shows a graphical rendering 200*c* of the 5×3 game grid centered without stretching to fit a cabinet display with a 9:16 aspect ratio. This technique fails to use the entirety of the cabinet display screen and may appear diminutive to players.

Therefore, the prior art techniques are inadequate, because using the same kind of symbol grid for a game result may not provide a positive player experience. Because may prefer to play electronic pull-tab tickets from a single deck across various gaming devices employing different display formats, it would be beneficial to provide a system and method to support the generation and distribution of electronic pull-tab tickets that can be displayed with different game grid dimensions depending on the gaming device to which each electronic pull-tab ticket is distributed.

SUMMARY

A pull-tab gaming system is described that includes a network component that generates a plurality of electronic pull-tab decks, in which each electronic pull-tab deck includes a plurality of intelligent pull-tab tickets, and a plurality of gaming devices that includes a first gaming device and a second gaming device. Each of the pull-tab tickets has an award value. Each of the plurality of gaming devices is communicatively coupled to the network component, and each gaming device has a particular gaming device hardware profile, including the first gaming device and the second gaming device, which have a first gaming device hardware profile and a second gaming device hardware profile, respectively, that are different from one another.

In operation, the network component receives a first intelligent pull-tab ticket request from the first gaming device and the network component, subsequently, selects a first intelligent pull-tab ticket having a first award value, which first intelligent pull-tab ticket the first gaming device receives. The first gaming device then displays a first graphical rendering that corresponds to the first gaming device hardware profile.

The network component also receives a second intelligent pull-tab ticket request from the second gaming device and the network component, subsequently, selects a second intelligent pull-tab ticket having a second award value, which second intelligent pull-tab ticket the second gaming device receives. The second gaming device then displays a second graphical rendering that is different from the first graphical rendering and corresponds to the second gaming device hardware profile.

In some embodiments, each pull-tab ticket includes a plurality of graphical renderings, in which each graphical rendering is associated with a gaming device hardware profile. When the first gaming device receives the first pull-tab ticket from the network component, it selects the first graphical rendering of the plurality of graphical renderings for display because the first graphical rendering corresponds to the first gaming device hardware profile.

In some embodiments, the network component determines the first graphical rendering based on the first gaming device hardware profile and the second graphical rendering based on the second gaming device hardware profile. The network component then transmits the first graphical rendering corresponding to the first gaming device hardware profile to the first gaming device and transmits the second graphical rendering corresponding to the second gaming device hardware profile to the second gaming device.

In some embodiments, each pull-tab ticket includes a plurality of graphical renderings including the first graphical rendering and the second graphical rendering, in which each graphical rendering is associated with one gaming device hardware profile.

In some embodiments, the network component further includes a rendering module. The rendering module includes a plurality of graphical renderings including the first graphical rendering and the second graphical rendering, in which each graphical rendering is associated with one gaming device hardware profile.

In some embodiments, each gaming device further includes a rendering module. The rendering module(s) include a plurality of graphical rendering that include the first graphical rendering and the second graphical rendering, in which each graphical rendering is associated with one gaming device hardware profile.

In some embodiments, the network component determines the award value of each intelligent pull-tab ticket, and each gaming device determines one graphical rendering for display based on each gaming device hardware profile.

A method for providing intelligent pull-tab tickets is also described, the method begins with a network component that generates a plurality of electronic pull-tab decks, in which each electronic pull-tab deck includes a plurality of intelligent pull-tab tickets, and where each of the intelligent pull-tab tickets has an award value. The method proceeds where a first gaming device transmits a first intelligent pull-tab ticket request, and a second gaming device transmits a second intelligent pull-tab ticket request. The first gaming device includes a first gaming device hardware profile and the second gaming device includes a second gaming device hardware profile. The network component then selects a first intelligent pull-tab ticket and a second intelligent pull-tab ticket from an electronic pull-tab deck in response to receiving first and second intelligent pull-tab ticket requests. The first intelligent pull-tab ticket has a first award value and the second intelligent pull-tab ticket has a second award value, and the first award value is the same as the second award value. The first gaming device then receives the first intelligent pull-tab ticket from the network component and the second gaming device then receives the second intelligent pull-tab ticket from the network component. The first gaming device then displays a first graphical rendering that corresponds to the first gaming device hardware profile, and the second gaming device then displays a second graphical rendering that corresponds to the second gaming device hardware profile. In this embodiment, the second graphical rendering is different from the first graphical rendering.

FIGURES

The illustrative embodiments may be more fully understood by reference to the following drawings which are for illustrative, not limiting, purposes.

Figure 2A:
Figure 2B:
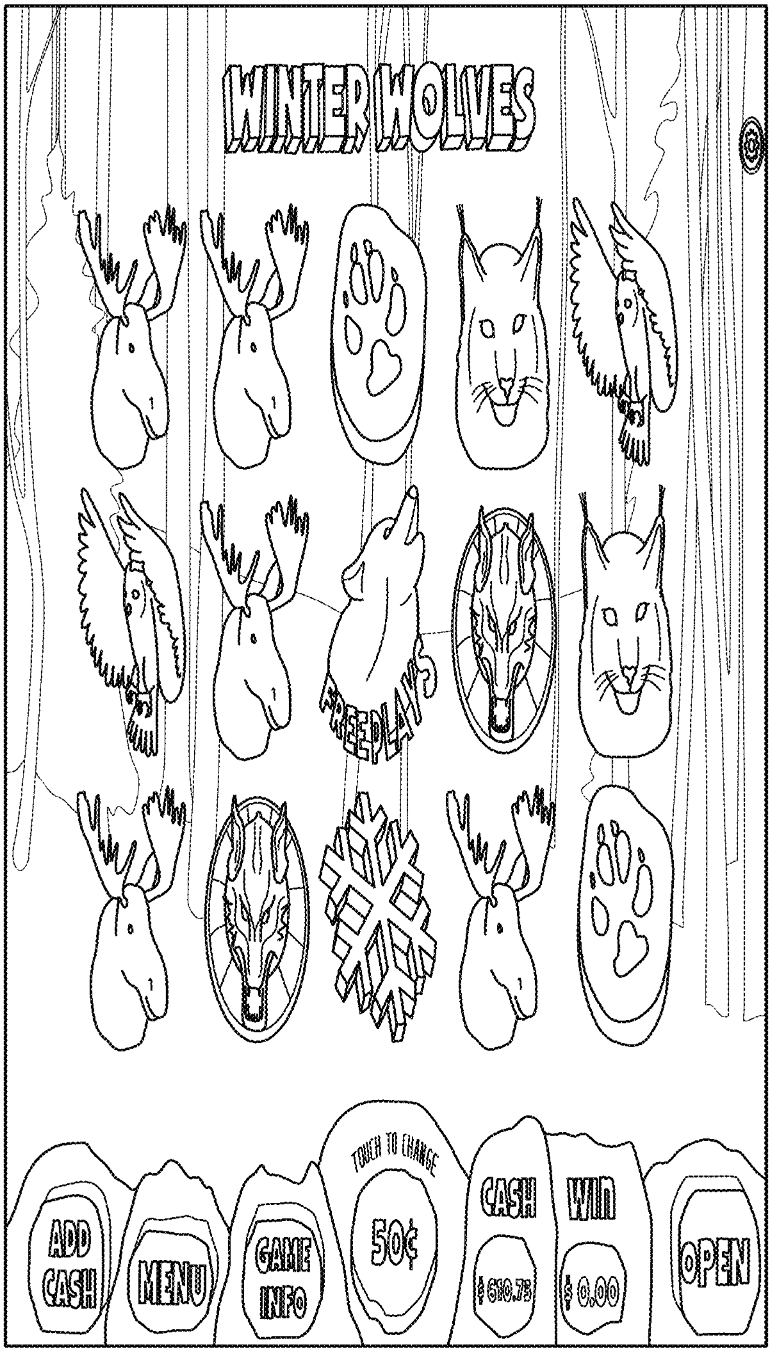
Figure 2C:
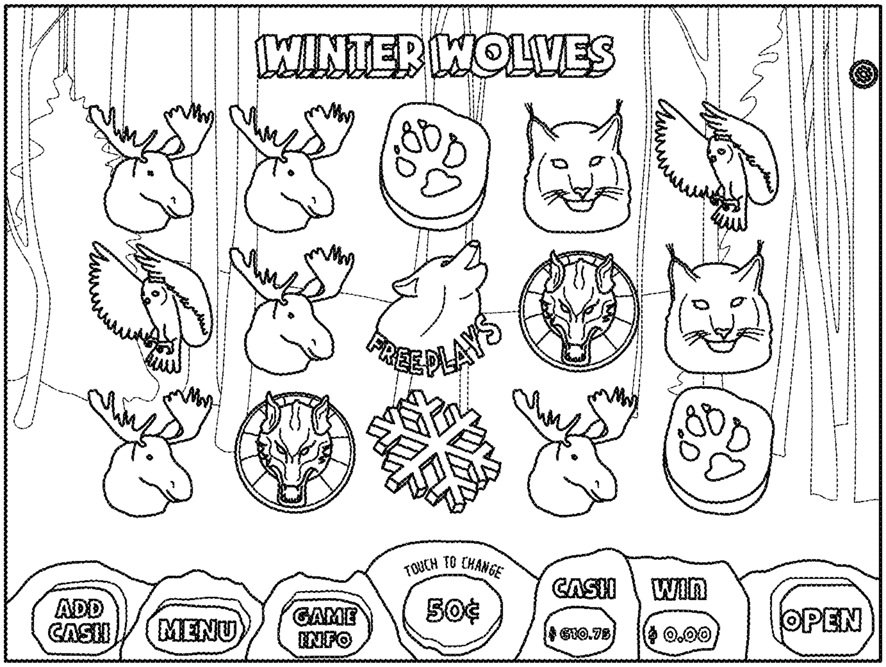

FIGS. 2A-C show various display formats of a 5×3 symbol grid for an illustrative electronic pull-tab ticket graphical rendering.

Figure 3A:
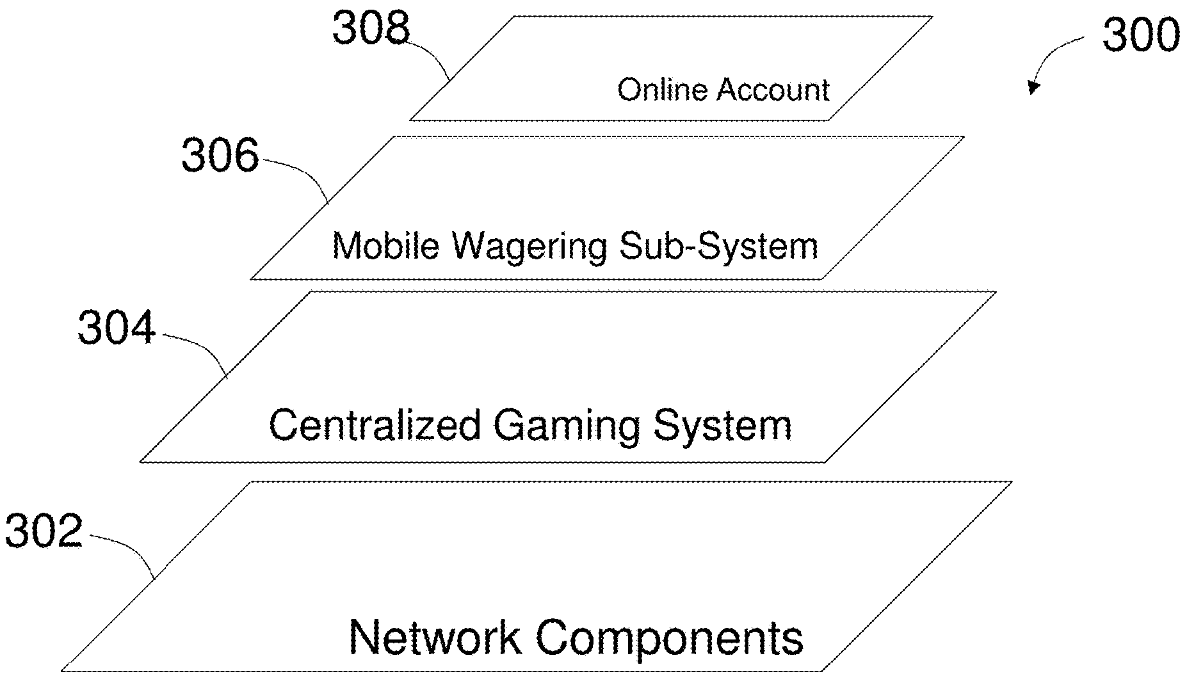
Figure 3B:
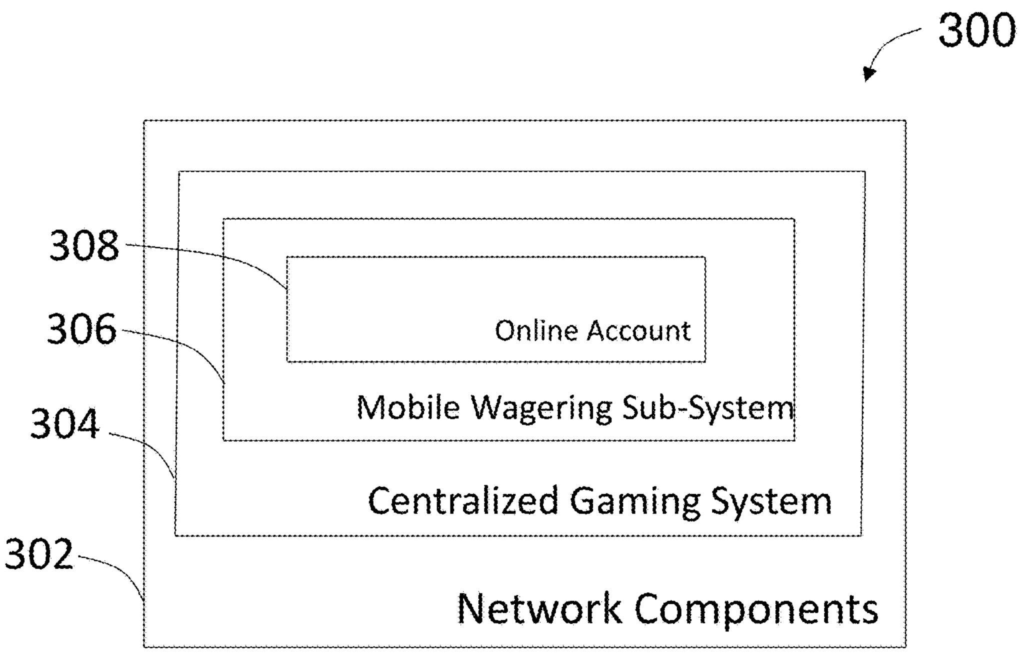

FIGS. 3A and 3B show an illustrative gaming system that includes a layer of network components, a centralized gaming system, a mobile wagering sub-system and an online account.

Figure 3C:
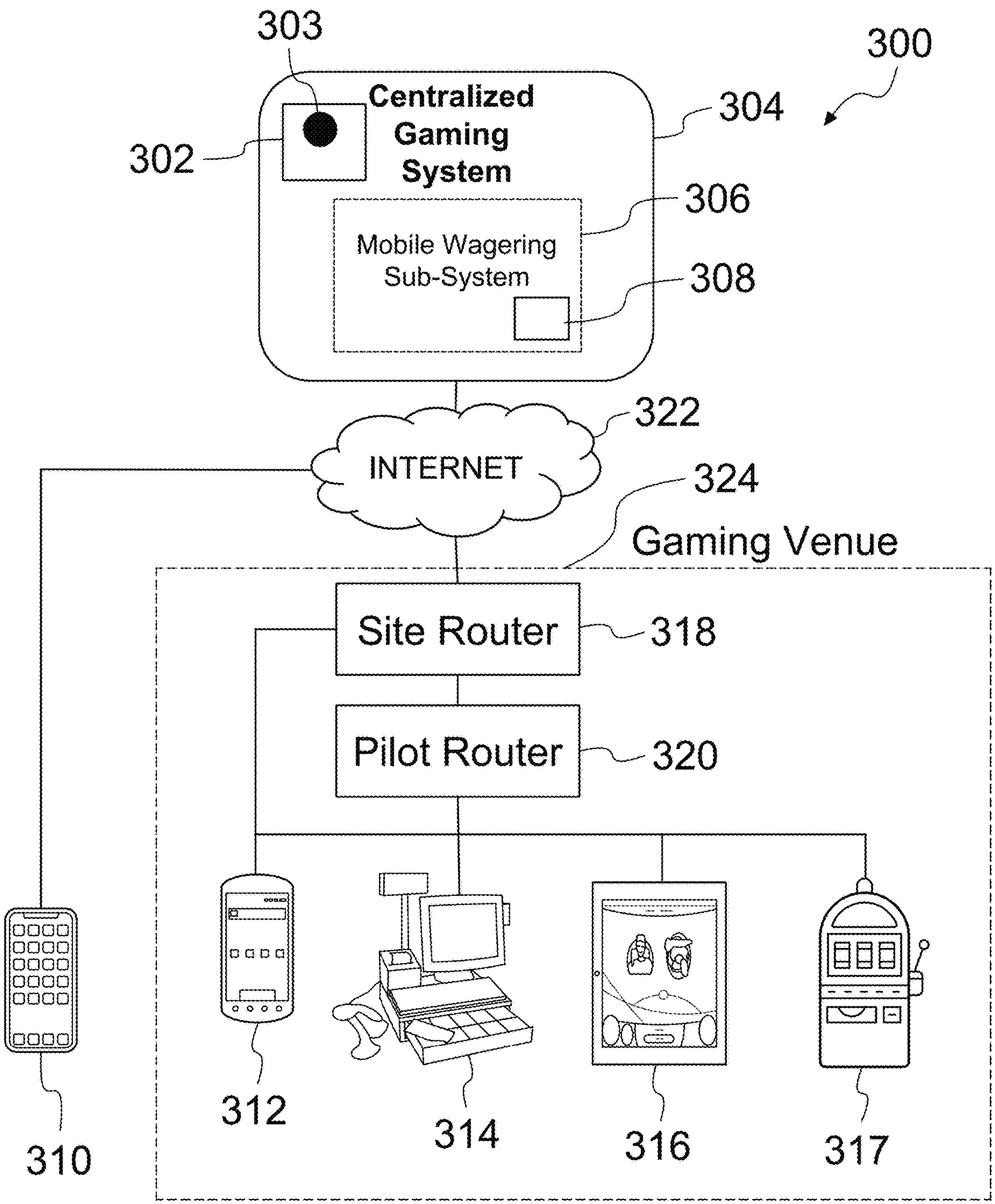

FIG. 3C shows an expanded view of the illustrative gaming system that includes various client devices.

Figure 4:
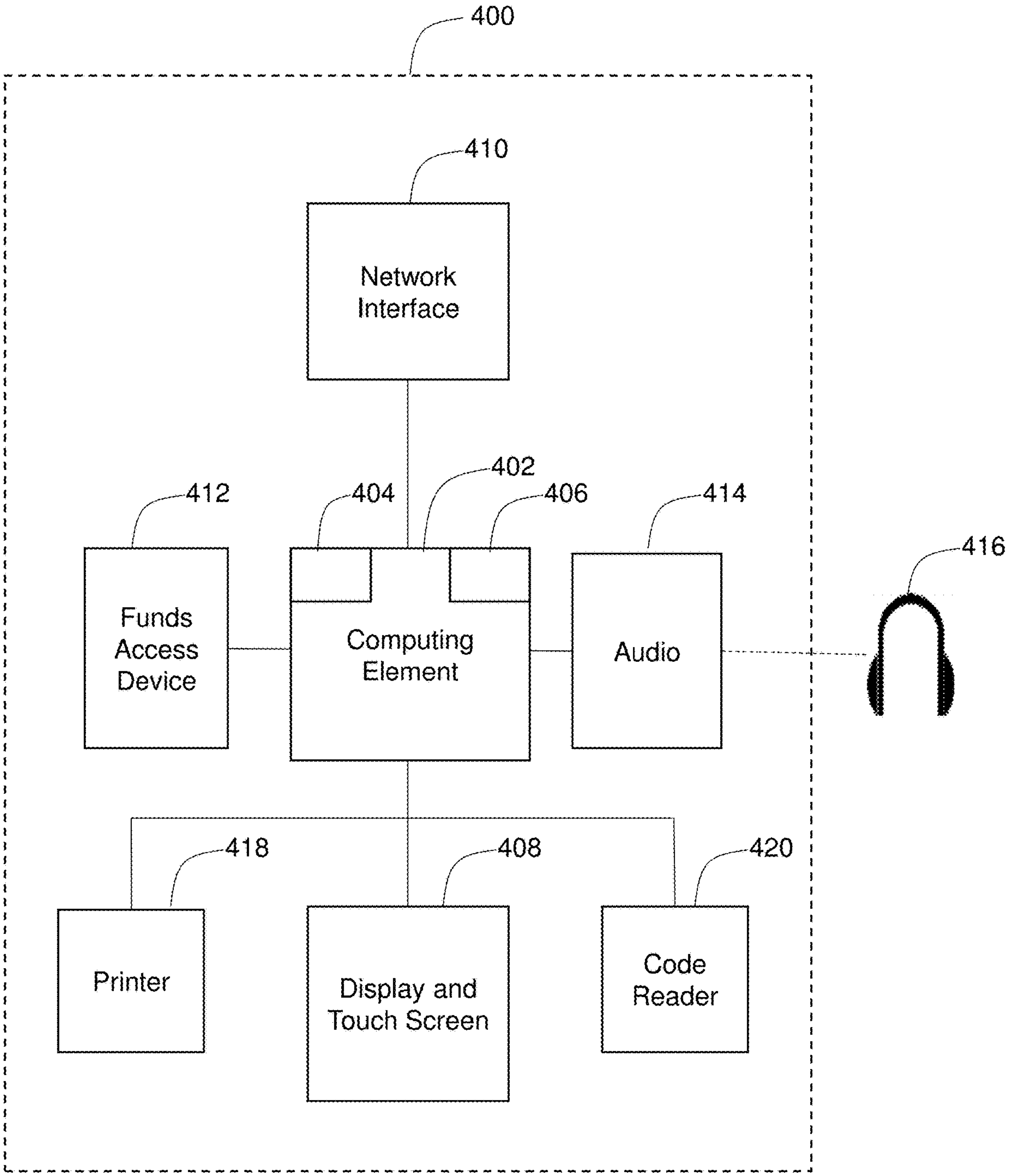

FIG. 4 shows an illustrative player interface unit, which may be embodied as either a mobile device or a point-of-sale (POS) device.

Figure 5:
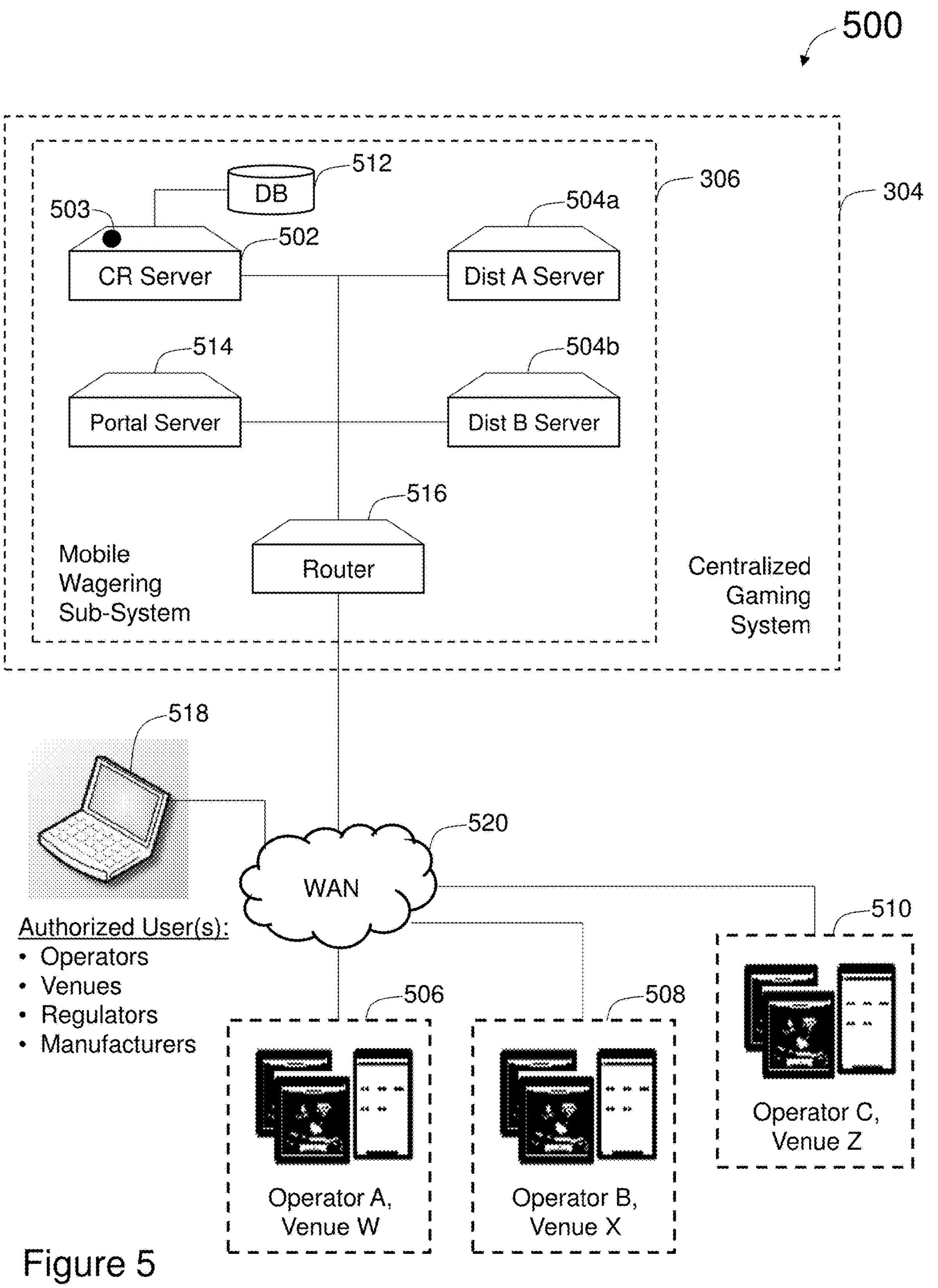

FIG. 5 shows further detail for the centralized gaming system that includes the mobile wagering sub-system, which is communicatively coupled to multiple venues.

Figure 6:
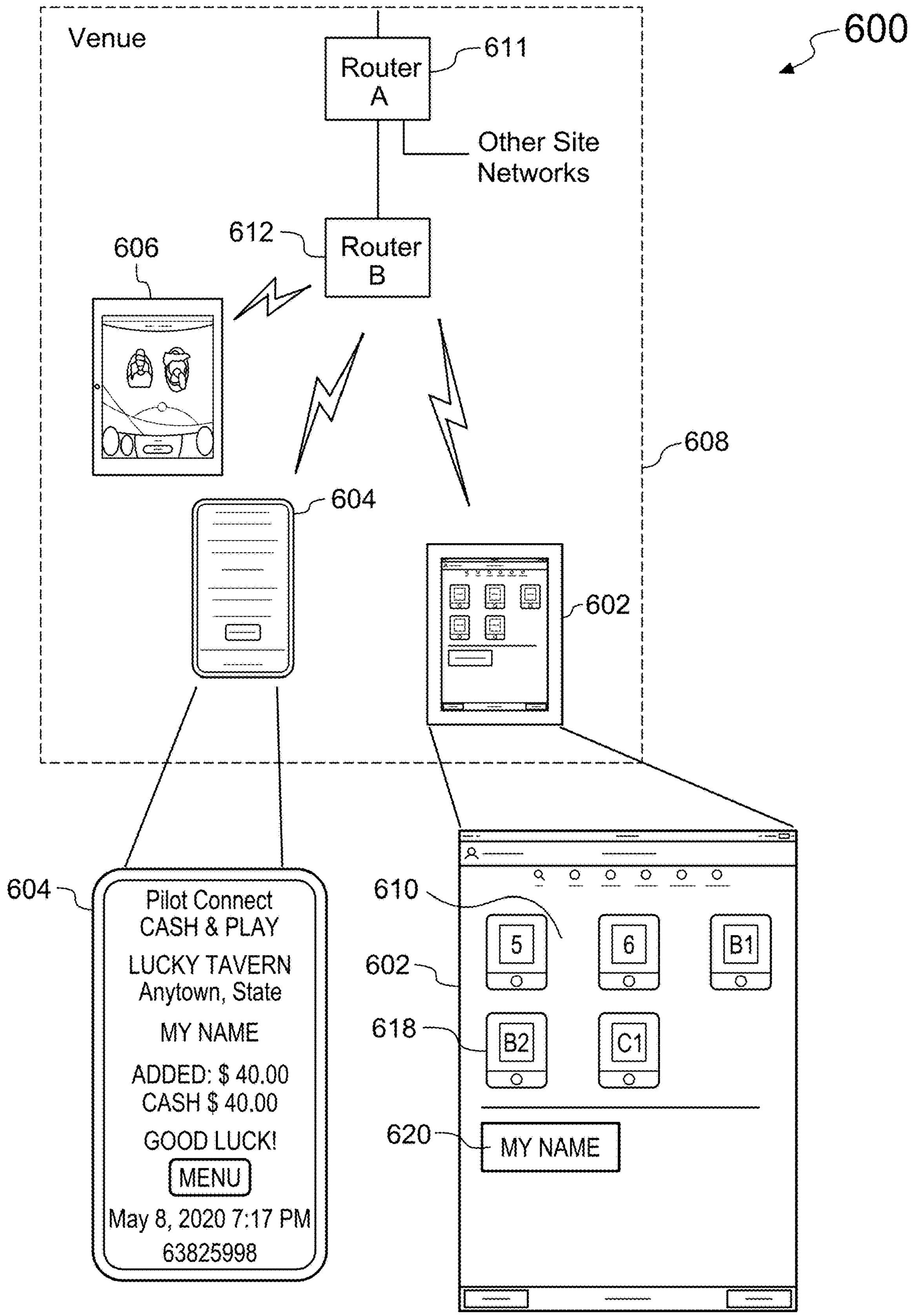

FIG. 6 shows an illustrative point-of-sale (POS) device communicatively coupled to mobile devices in a gaming venue.

Figure 7:
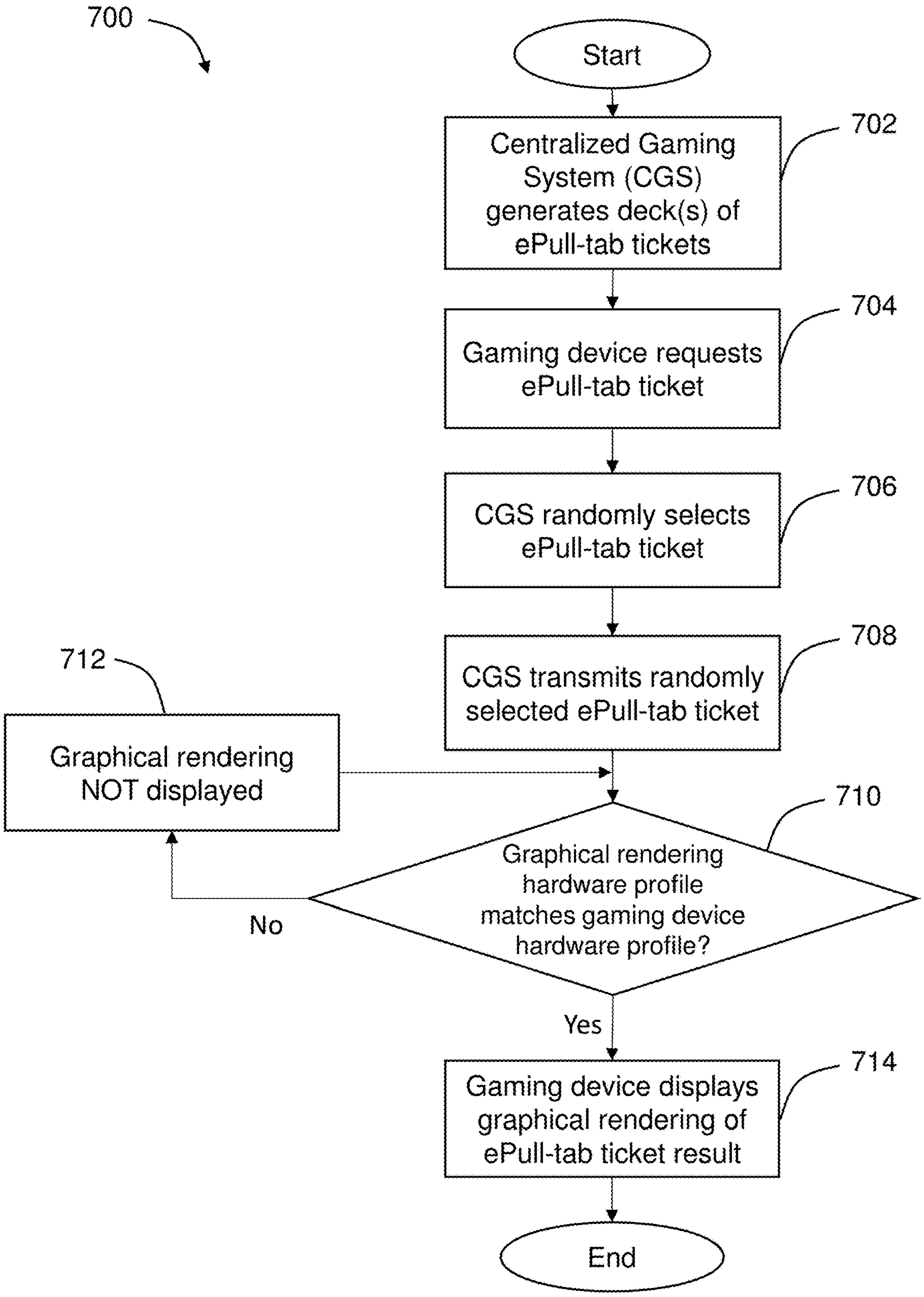

FIG. 7 shows an illustrative method for generating and distributing intelligent electronic pull-tab tickets.

FIGS. 8A-D show a second illustrative method for generating and distributing intelligent electronic pull-tab tickets.

Figure 9A:
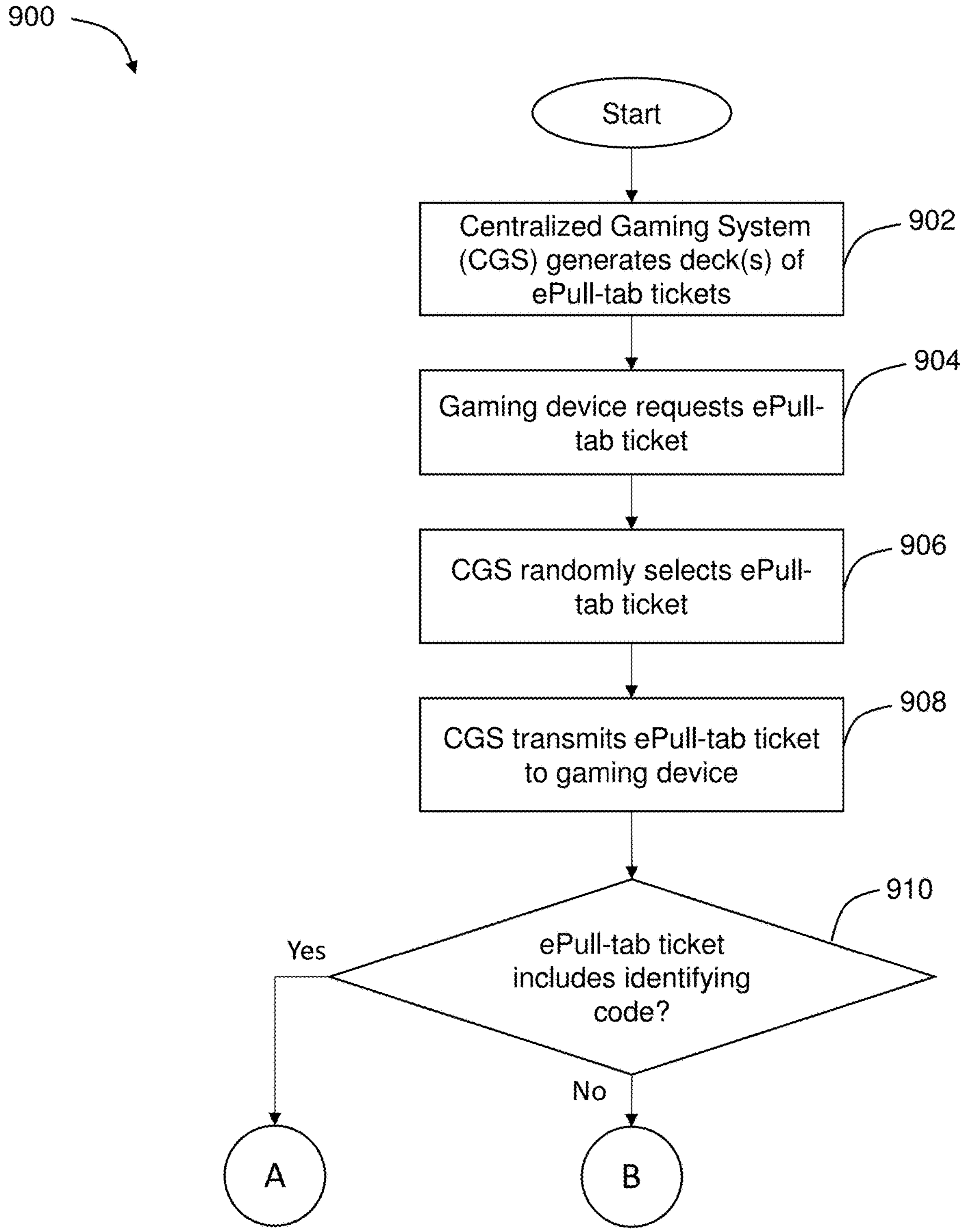
Figure 9B:
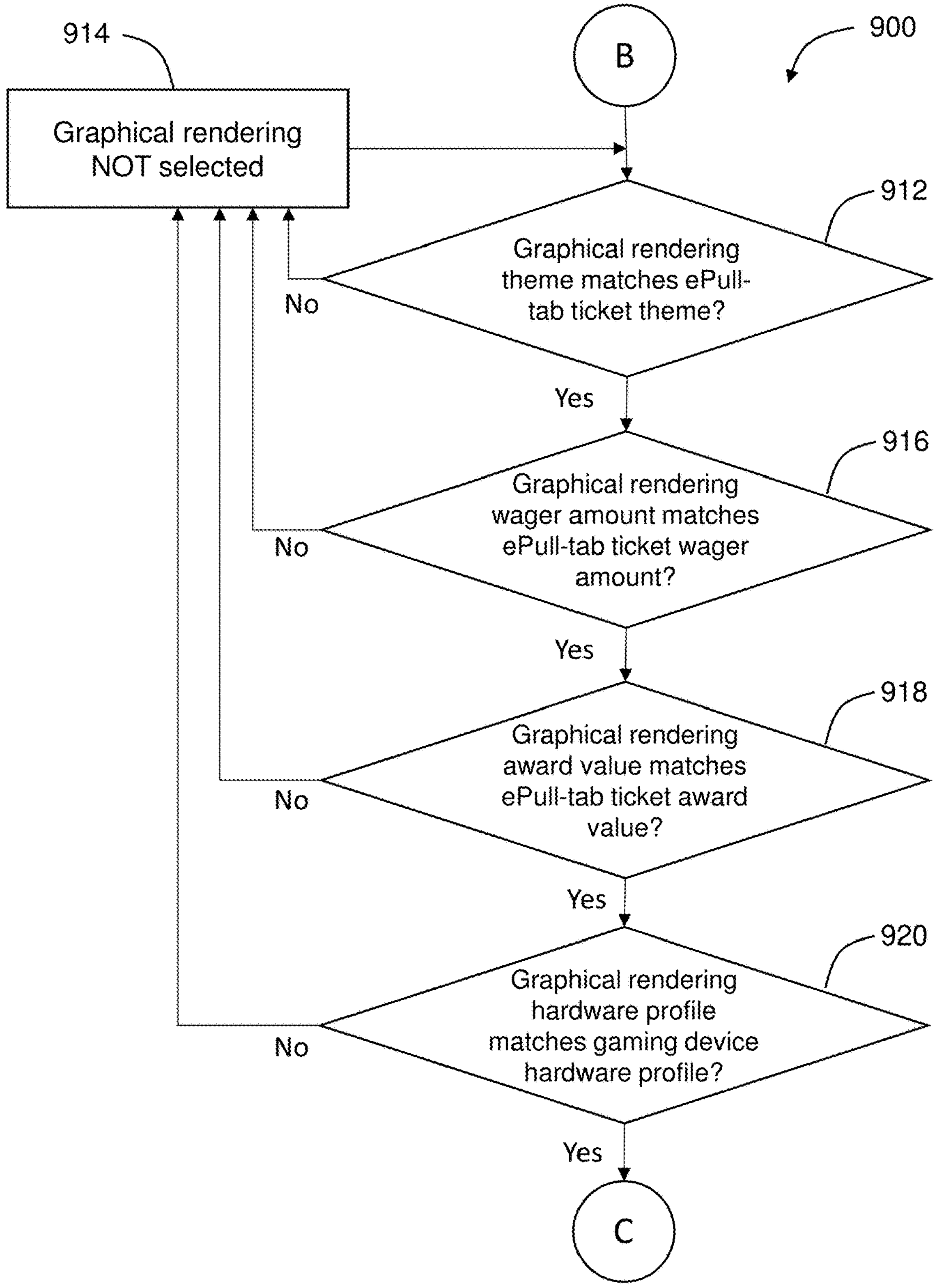
Figure 9C:
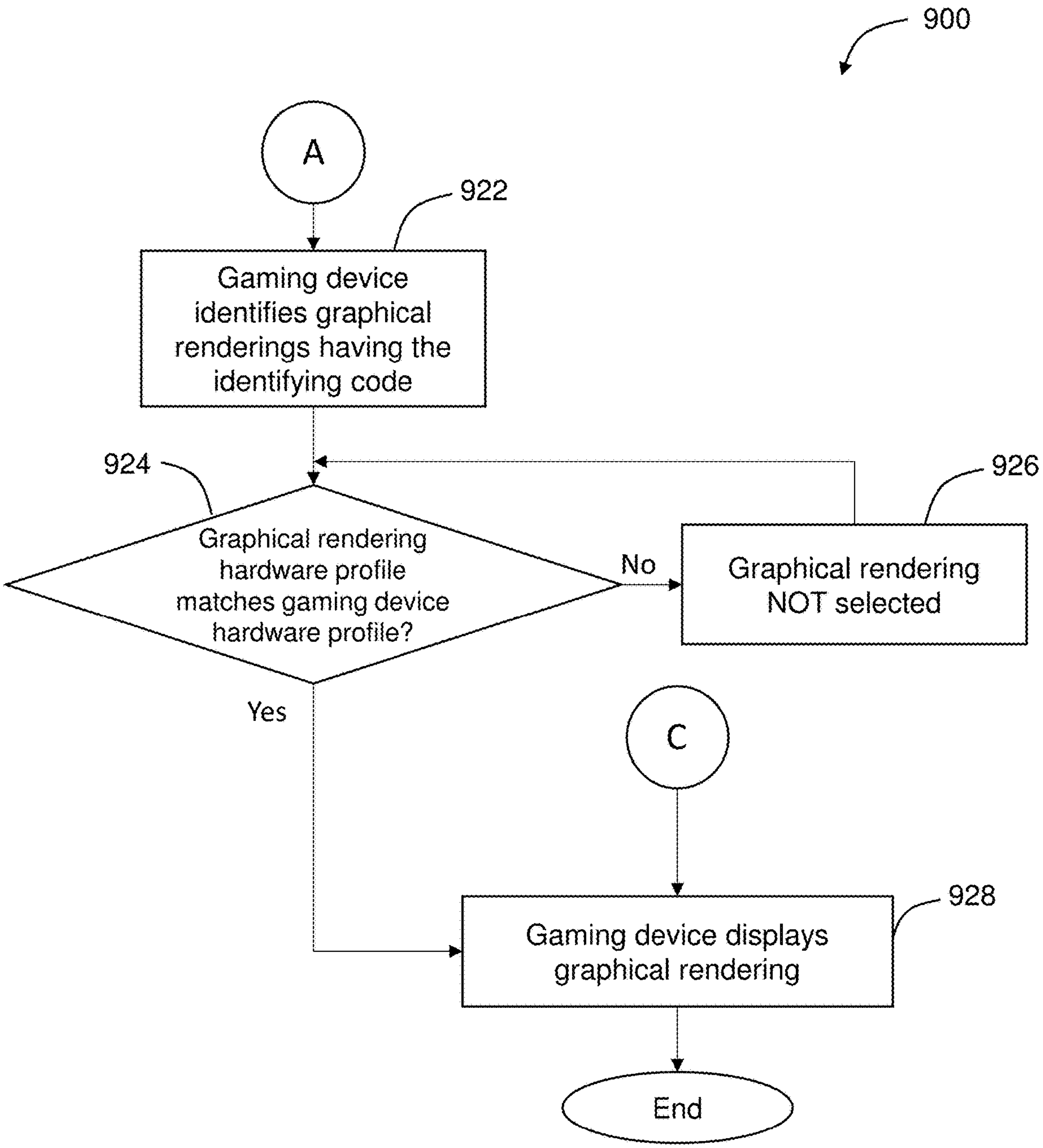

FIGS. 9A-C show a third illustrative method for generating and distributing intelligent electronic pull-tab tickets.

DESCRIPTION

Persons of ordinary skill in the art will realize that the following description is illustrative and not in any way limiting. Other embodiments of the claimed subject matter will readily suggest themselves to such skilled persons having the benefit of this disclosure. The various illustrative embodiments will now be described more fully with reference to the accompanying drawings. It should be understood that this disclosure and the claims may be embodied in many different forms and should not be construed as limited to the embodiments set forth herein. Additionally, those familiar with computing systems shall appreciate that there are many variants possible for the described systems, depending on the nature of the available networks, legal frameworks, which can open or restrict the types of locations in which the system can be operated, advances in server and networking technologies, etc.

The system and method presented herein supports the generation and distribution of intelligent electronic pull-tab tickets that are playable on both fixed gaming machines, mobile venue provided-gaming devices, and personal mobile devices. These intelligent electronic pull-tab tickets facilitate display of a game result, such as a game grid, sized and formatted for the particular device on which it is displayed without the need for centering or stretching the game result display image, or the use of multiple decks of electronic tickets associated with different display sizes and formats.

In an illustrative embodiment, a mobile application operating on a patron's personal mobile device incorporates a hardware profile identifying the personal mobile device's type of display into a ticket request that is transmitted to a central gaming authority, such as a remote server. The central gaming authority then randomly selects an intelligent electronic pull-tab from a desired deck, where the intelligent electronic ticket includes a graphical rendering for each hardware profile known to the central gaming authority. In some embodiments, the central gaming authority randomizes each deck of intelligent electronic pull-tab tickets, then pulls tickets from the decks sequentially as ticket requests are received. The central gaming authority then selects the graphical rendering associated with the hardware profile matching that of personal mobile device and transmits the intelligent electronic ticket and appropriate game rendering to the personal mobile device.

In some embodiments, the selection of the graphical rendering is made by a rendering module from a database of graphical renderings. In other embodiments, the rendering module generates graphical renderings for selection by the central gaming authority. The personal mobile device can then display the game rendering that is formatted specifically for the display associated with the personal mobile device's hardware profile without need for centering, stretching, or any other visual adjustment. In the illustrative embodiment, an online cash account may be associated with a wagering game that operates on the patron's personal mobile device.

In another illustrative embodiment, the central gaming authority transmits the selected intelligent electronic ticket and all associated game renderings to the requesting gaming device. The requesting gaming device then searches for the game rendering associated with a hardware profile matching the gaming device's hardware profile. In some embodiments, the gaming device includes a rendering module, such as a software application downloaded thereon, that searches for the game rendering associated with the hardware profile matching the gaming device's hardware profile. The gaming device then displays the game rendering that is formatted specifically for the display associated with the personal mobile device's hardware profile without need for centering, stretching, or any other visual adjustment.

In still another illustrative embodiment, the central gaming authority transmits only the selected intelligent electronic ticket to the requesting gaming device. The gaming device (or a rendering module stored thereon) then searches a database of game renderings for one matching the game theme, wager amount, and award value of the intelligent electronic ticket, as well as the hardware profile of the gaming device. The gaming device then displays the game rendering that is formatted specifically for the display associated with the personal mobile device's hardware profile without need for centering, stretching, or any other visual adjustment.

In all embodiments, the gaming systems and methods presented herein include a mobile wagering system that is designed to be used in wagering applications within legal gaming frameworks. More specifically, the gaming systems and methods presented herein support centralized control of wagering that takes place in multiple wagering venues, which may also be referred to as a "gaming venue." In some embodiments, actions related to, or constituting, wagering may take place outside a wagering venue, but within a regulated area, i.e., the state within which the wagering venue associated with (or providing) a wagering game is located.

The illustrative gaming venues may include a charity, a lottery outlet, a casino and any other such authorized or licensed gaming venue. Additionally, a gaming venue includes a church, service club, hotel, bar, restaurant, convenience store and other such locations that support licensed gaming activity. Note, that the term "gaming" refers to games of chance or games that include a chance component, in which a wager is received, and the awarded prize is dependent on the outcome of the game of chance or of the chance component, such as pull-tab games, linked bingo game tournaments, slot games, video poker games, and other such games. For example, in some cases, each gaming venue may be associated with a sponsoring organization, e.g., a charity, and/or an additional business entity, e.g., a distributor. The types of venues, sponsoring organizations and other business entities will vary according jurisdictional statutes and regulation.

As described in further detail herein, the gaming system and method includes a Mobile Wagering Sub-system (MWS). The gaming system is communicatively coupled to a plurality of remote gaming venues, in which each remote gaming venue has at least one associated mobile client device that supports customer wagering. Additionally, each remote gaming venue may include one or more Point-of-Sale stations that manage player funds. In the illustrative embodiments presented herein, the various elements of the gaming system are communicatively and operatively coupled to one another with a network structure that includes the Internet as the backbone and at least one secure Wi-Fi network within each gaming venue.

Referring to FIGS. 3A and 3B there is shown an illustrative gaming system 300 that includes a layer of network components, a centralized gaming system, a mobile wagering sub-system and an online account. Computer network components or network components 302 refers to the hardware components of a computer network. By way of example and not of limitation, the network components may include the hardware components of a Local Area Network or a secure Wide Area Network. Network components may include servers, software, modems, routers, switches, hubs, Network Interface Cards (NICs), wireless access points, firewalls, internet appliances, databases and other such computer hardware.

In the illustrative embodiment, the servers may be communicatively coupled to a Wide Area Network, e.g. Internet. The network communications between the network components may operate as a single network, a distributed network, a hierarchical network or other network design. The network components can support server virtualization, virtual machines, containers, containerization, and other such computing environments.

Network components receive and transmit data packets to other network components or to client devices. For example, a network component may include a server that includes a list of gaming venues, and another network component may store mobile gaming content for a mobile application. Gaming content may include graphical renderings for ticket results.

The illustrative network components 302 provide the hardware that supports the central gaming system 304. The illustrative mobile wagering sub-system 306 controls and manages the mobile wagering activities that are associated with the central gaming system 304. The illustrative online account 308 is controlled and managed by the mobile wagering sub-system 306.

Thus, the network component 302 provides the computer hardware components which support the central gaming system 304. The mobile wagering sub-system 306 is a software component or module of the central gaming system 304. The online account 308, as described herein, is a further sub-component or sub-module of the mobile wagering sub-system 306.

Referring to FIG. 3C, there is shown a more detailed view of the gaming system 300 for funding an online account 308. In some embodiments, the gaming system 300 supports anonymously funding an online account 308 that is a temporary cash account. The illustrative gaming system 300 includes a personal mobile device 312, an online account 308 associated with the mobile wagering sub-system 306, a Point-of-Sale (POS) device 314 and a network component 302 associated with a centralized gaming system 304. In some embodiments, the network component 302 includes a rendering module 303 that stores, searches, and/or generates graphical renderings that may be associated with intelligent electronic pull-tab tickets. In the illustrative embodiment, the personal mobile device 312 is communicatively coupled to the network component 302 because the personal mobile device 312 is recognized as within the gaming venue 324. In some embodiments, the online account 308 can be shared with the centralized gaming system 304.

The online account 308 may have a predefined duration period. In embodiments where the online account 308 is an anonymously funded temporary cash account 308, the cash account 308 forfeits funds upon user termination of a session or expiration of the predefined duration period. The Point-of-Sale (POS) device 314 is also communicatively coupled to the network component 302. In some embodiments, the POS device 314 is associated with the gaming venue 324. In some embodiments, the POS device 314 is located within the gaming venue 324.

More specifically, the centralized gaming system 304 includes one or more network components 302 such as a multiplicity of servers that are communicatively coupled to one another. The illustrative network components, e.g., servers, are associated with the mobile wagering sub-system 306. In the illustrative embodiment, the mobile wagering sub-system 306 operates with network components, e.g., servers, that may be physical or logical devices in a virtual array in a cloud configuration. By way of example and not of limitation, servers are communicatively coupled to a Wide Area Network 322, e.g., Internet, which is communicatively coupled to a plurality of gaming venues, namely, gaming venue 324 and other such licensed locations.

In the illustrative embodiment, the gaming venue 324 includes a plurality of venue-provided mobile devices 316 and fixed gaming machines 317, such as slot machines, video poker terminals, EGMs, etc. Further still, the illustrative gaming venue includes a Point-of-Sale (POS) device 314. The illustrative venue-provided mobile devices 316 and the POS devices 314 are client devices configured to communicate with each other and the mobile wagering sub-system 306.

In operation, the venue-provided mobile devices 316 and POS devices 314 are registered with the mobile wagering sub-system 306, which includes a database (not shown) that associates the venue-provided mobile devices 316 and POS devices 314 with a designated gaming venue 324. The venue-provided mobile devices 316 and POS devices 314 have been pre-configured to communicate with the mobile wagering sub-system 306. Venue-provided mobile devices 316 and POS devices 314 do not communicate with the centralized gaming system 304 when the client devices are not located at the gaming venue 324. Illustrative venue-provided mobile devices 316 include, but are not limited to, tablet devices or other such wireless devices.

The personal mobile device 312 may include smartphones or tablets, such as an iOS device or an Android device, which are not pre-configured to communicate with the mobile wagering sub-system 306. The personal mobile devices 310 and 312 may interact with the system if they are properly loaded with an appropriate mobile application program that identifies the personal mobile device. The mobile application program may also indicate the personal mobile device 312 as being within a gaming venue, such as gaming venue 324, and indicate the personal mobile device 310 as being located outside a gaming venue, such as gaming venue 324.

When the mobile application program identifies the personal mobile device 312 as being within the gaming venue 324, communications from the personal mobile device 312 with the centralized gaming system 304 may not be limited. Personal mobile device 310 is outside of the gaming venue 324, communications from the personal mobile device 310 with the centralized gaming system 304 may be limited.

The illustrative mobile devices 316 and 312 operate as wireless client devices that are communicatively coupled to the centralized gaming system 304 because the mobile devices are within the gaming venue 324. Note, the POS device 314 may also operate as client device. The mobile personal device 312 can interact with the centralized gaming system 304 because the mobile personal device 312 is in the gaming venue 324 and is properly loaded with the appropriate mobile application program. Personal mobile device 310 may also operate as a wireless client device that is communicatively coupled to the centralized gaming system 304 because it is properly loaded with the appropriate mobile application program even though it is located outside the gaming venue 324.

Additionally, the centralized gaming system 304 may be communicatively coupled to non-mobile clients, i.e., fixed client devices, within the gaming venue(s) 324. The non-mobile clients disposed in the gaming venues and communicatively coupled to the centralized gaming system 304 include, but are not limited to, wired devices such as electronic gaming machines (EGMs), slot machines, PCs, stationary monitors, Internet appliances, Internet of Things (IoT) devices and other such non-mobile devices with hardwire connections or wireless connections to the Wide Area Network 322. The non-mobile client devices may be configured to participate in the games associated with the mobile wagering sub-system 306.

The mobile client devices 310, 312, and 316, comply with the system-centric wagering requirements in which determination of all wagering results and accounting activity are controlled by the mobile wagering sub-system 306 and have the communications infrastructure, directly or by proxy, to interact with the central gaming system 304. The central gaming system 304 includes a plurality of server applications that are configured to provide high-availability and redundancy, process all inputs, and generate outputs.

By way of example and not of limitation, the centralized gaming system 304 includes four (4) different types of network communications. Firstly, there are network communications between the one or more network components 302 and the corresponding mobile wagering sub-system 306. Secondly, there are network communications between the network components 302 and the gaming venues 324. Thirdly, there are network communications within the gaming venues with the personal mobile device 312, the POS 314 and the venue-provided mobile devices 316. Fourthly, there are network communications outside the gaming venues between personal mobile devices 310 and 312, the mobile wagering sub-system 306, the centralized gaming system 304, and/or the online account 308.

Communication within gaming venue 324 is facilitated by one or more routers 318 and 320. These routers provide wired and/or wireless Wi-Fi services between the external network 322 and mobile devices 312, 314 and 316 within the gaming venue 324. These routers can be configured in a variety of ways depending on regulatory and security requirements. In one preferred embodiment, site router 318 provides a Wi-Fi SSID which provides generalized services to a variety of services unrelated to the wagering system. It may also include a wired connection to router 320, which provides a second Wi-Fi SSID which is only dedicated to the wagering system. Other embodiments allow bridging between the routers. In yet another embodiment, a dedicated communication server (not shown) may provide additional network security for wagering functions.

In one embodiment, when a mobile device is in a gaming venue, the network component 302 determines a device identifier value that is unique to the specific gaming venue. The illustrative network component 302 may create that identifier or it may have a screen-name suggested by the application on the mobile device as entered by the user, in which case the network component would validate that the suggested value is unique at the gaming venue. In one embodiment, the determined device identifier value is sent to the mobile device and the POS at the gaming venue. In one embodiment, the determined device identifier value is sent to the mobile device and an online portal associated with the gaming venue.

With respect to network communications between the network components, the illustrative network components may operate as a single network, in which the network components can communicate with one another using service requests. By way of example and not of limitation, the illustrative network components have two internet protocol addresses, namely, a Private IP used to maintain the server network and ensuring secure server-to-server communication, and a Public IP that is bound to the Internet and that provides access to server services through high security communications such as HTTPS. The network components use their private IPs for server-to-server communication so that these services are not exposed to the Internet, the game application running on the mobile devices and the POS devices.

By way of example and not of limitation, each server is configured with an SSL certificate which supports HTTPS calls. The illustrative server is configured to forward some requests it receives through HTTPS to a local port, and the requests that are allowed to pass are only those available to "Game" and "POS" devices. This illustrative configuration ensures that only very specific requests are allowed from the public IP. By way of example and not of limitation, the illustrative servers operate using the Linux operating system and Restful programming techniques that include Java as the programming language with Jersey RS support. Database structures are contained in a MySQL database. Communication between the server components, and the remote client devices is performed over a wide-area network 322. As described above, these network communications are performed using secure SSL communications over the Internet.

For purposes of this patent application, the venue-provided mobile devices 316 and personal mobile devices 310 and 312 may also be referred to as "player interface units," which are described in further detail in FIG. 4.

An online player account (not shown) is associated with each of the mobile devices 310, 312, and 316. By way of example and not of limitation, the online player account is described as a short-term, anonymous entity tied to the client device being used by the player, and which expires when the fund balance drops to zero. However, it is possible in other embodiments to have non-financial online player accounts which may exist for longer time periods and be tied to a player.

Additionally, it should be noted that while the illustrative embodiments presented herein generally describe financial transactions such as adding funds or cashing out at the POS device 314, in different regulatory environments or with different technology, such player accounts can have financial transactions originating at the player device or any other client device that may be configured to support POS transactions. Furthermore, the financial transactions may be supported at a system level with a network component or server module that provides web portal functions for financial transactions. Thus, the financial transactions may be performed by the client device, a network component, a server module, or any combination thereof. Depending on regulatory issues and available technology, financial transactions may be based on cash, credit cards, debit cards, digital currency or other mediums of finance.

Referring now to FIG. 4, there is shown an illustrative player interface unit 400, which may be embodied as either venue-provided mobile device 316, point-of-sale device 314, personal mobile devices 312 and 310, or any combination thereof.

The illustrative player interface unit 400 includes a central computing element 402 with a processor 404 and memory storage 406. In one illustrative embodiment, the venue-provided mobile device 316 may include a pre-installed software module, such as a rendering module, that is associated with the gaming venue 324. The pre-installed software module may include game title files stored on remote network components that support a mobile application, i.e., a mobile "app" store. This pre-installed software module may include one or more databases of game renderings, wherein each game rendering includes a variety of attributes, such as an associated game theme, wager amount, award value, and hardware profile, such that the database may be searchable for any one or more of these attributes.

In one illustrative embodiment, and the player interface unit 400 downloads a mobile application that includes one or more game title files, runs one or more game title files and enables the user to interact with the corresponding game title. In another illustrative embodiment, a mobile application is downloaded to the personal mobile devices 310 and/or 312 and the mobile application enables the personal mobile devices 310 and 312 to be communicatively coupled to at least one network component 302 associated with the centralized gaming system 304.

In the illustrative embodiment, the mobile application includes a wagering game operating on the personal mobile device 310 and 312, and the cash account 308 funds the wagering game. The mobile application may also receive the device identifier, e.g., screen name, and the mobile application receives the unique session identification value. The mobile application may also display the device identifier with a large image of the device identifier when the personal mobile device 312 is near the POS device.

The unique session identification value is generated by the network component, which communicates the unique session identifier to the personal mobile device 310, the personal mobile device 312, or POS device 314. The unique session identification value is incorporated in all data messages between the mobile device 312, the POS device 314 and the network component for integrity verification. In some embodiments, the unique session identification value is incorporated in all data messages between the mobile device 310 and the network component for integrity verification.

In operation, the mobile application requests a geo-location data set from the personal mobile device 310 and/or 312 such as information about a local Wi-Fi access point or GPS coordinates. The illustrative mobile application then proceeds to communicate the geo-location data set to the network component 302. The geo-location data set that is communicated to the network component 302 is used to determine if the personal mobile device 312 is within a gaming venue 324. The illustrative network component 302 accesses a database (not shown) that includes a list of gaming venues for the funding (anonymous or otherwise) of an online account with cash, card, or e-currency. The illustrative network component 302 may also access a database (not shown) that includes a list of areas within which game play is sanctioned. The illustrative network component 302 may also access a database (not shown) that includes a definition of one or more areas within which game play is sanctioned, wherein the definitions may include GPS coordinates, IP addresses, and any combination thereof.

By way of example and not of limitation, the database may include Wi-Fi access point information that is used in conjunction with, or instead of, geo-location data to identify gaming venues 324. If data available to the network component confirms that the data received from a personal mobile device 312 originates from a known Wi-Fi access point matching one of the gaming venues, then the personal mobile device 312 is deemed within a gaming venue 324. For example, the network component may receive a Wi-Fi source message from the mobile application, in which the Wi-Fi source message is associated with a gaming venue.

The player interface unit 400 includes a color display with a touch-screen 408 and a network interface component 410, which provides network access to a local area network, a wide area network or any combination thereof. By way of example and not of limitation, the network interface component supports a wireless local area network such as a Wi-Fi network, which is based on IEEE 802.11 standards. Additionally, the mobile device 400 may communicate with the wide area network 322 via the illustrative Wi-Fi network. The communication between the mobile device 400 and the mobile wagering sub-system 306 may be performed using the illustrative HTTPS protocol or other such secure networking protocol that allows ticket inputs, commands and outputs to be communicated securely across the Wide Area Network.

In the illustrative embodiment, the player interface device 400 is a tablet computing device running iOS or Android operating systems. The illustrative player interface device 400 may also include a Funds Access Device module 412 that may be configured to have a custom locked profile to evade security-bypassing attempts. The Funds Access Devices (FAD) 412 may also provide alternative methods for starting play sessions or adding funds to existing sessions. By way of example and not of limitation, the Funds Access Device module 412 may include currency readers and debit/credit card readers such as a magnetic stripe reader, a smart-card reader, an infra-red reader, a Near-Field-Communications reader and other such financial transaction readers.

The illustrative player interface device 400 may also include an audio system component 414 that enhances the game-playing experience for the players. The audio system component 414 may also include a standard audio jack or Bluetooth interface so that player can use wired or wireless headphones 416 to improve the game audio environment without disturbing others.

In one illustrative embodiment, the player interface device 400 may include a printer 418 and a code reader 420. By way of example and not of limitation, the printer 418 generates vouchers. The illustrative code reader 420 may be embodied as a bar-code reader and/or QR-code reader that is configured to read vouchers generated by the printer.

By way of example and not of limitation, the player interface device 400 may be configured to include a "HELP" button in the game client that also dispatches a signal to the POS device 314 to notify the operator that the player is requesting assistance. In some embodiments, the "HELP" button dispatches a signal to a web portal notify an administrator that the player is requesting assistance. In some embodiments, the "HELP" button is provided through a user interface as a digital button. The player interface device 400 may also be configured to include a text-to-speech functionality to aid a visually impaired player. Additionally, the player interface device 400 may include a gaming application that downloads files, decompresses the downloaded files if they have been compressed, and caches all assets inside the player interface device 400. The mobile device 400 supports dynamic updates without the need to update the game client itself.

Referring now to FIGS. 3 and 4, the mobile wagering sub-system 306 is associated with network component 302, and both are communicatively coupled to a plurality of personal mobile devices 310 and/or 312 or venue-provided mobile devices 316, such as illustrative player interface unit 400. In one illustrative embodiment, the mobile wagering sub-system 306 receives a wager input for a ticket from a player interface device 400. In another illustrative embodiment, the mobile wagering sub-system 306 receives the wager input for a ticket from a plurality of mobile devices 310, 312, and/or 316, which may be disposed within a regulated area and/or at a plurality of different gaming venues 324.

The illustrative player interface device 400 presents a user interface on touch screen 408 that shows a plurality of game content associated with different types of tickets. In the illustrative embodiment, the player interface device 400 may also accept player inputs that are associated with a ticket. The ticket may perform various operations as described in further detail below.

Referring to FIG. 5, there is shown a further detailed schematic 500 for the centralized gaming system 304 that includes the mobile wagering sub-system 306, which is communicatively coupled to different venues. In an illustrative embodiment, the mobile wagering sub-system functionality is distributed between a plurality of different network components 302. The illustrative network components 302 include servers 502, 504, 514, database 512 and router 516. The network components 302 provide the hardware that supports the mobile wagering sub-system 306.

In the illustrative embodiment, the mobile wagering sub-system 306 is communicatively coupled to a centralized resource/manufacturer server 502 that performs as a coordinating entity for system operation and maintains authority over game operations controlled by the centralized gaming system 304. The mobile wagering sub-system 306 is also communicatively coupled to at least one distributor server 504 that is communicatively coupled to the centralized resource server 502.

In the illustrative embodiment presented in FIG. 4, a first distributor server 504*a* and second distributor server 504*b* are further communicatively to the centralized resource server 502. Each of the illustrative distributor servers 504 are configured to manage and control the game operations and cashier operations performed at a specified subset of the authorized locations or performed in association with a specified subset of the authorized locations. Distributor servers 504 may be associated with a distributor entity that is responsible for sales and support of a multiplicity of authorized locations, e.g., gaming venues.

For example, a first set of gaming venues 506 and 508 may be configured to communicate with the first distributor server 504*a*, which manages and controls the game operations at, and/or associated with, gaming venues 506 and 508. Additionally, for a third gaming venue 510 communicates with the illustrative second distributor server 504*b*, which manages and controls the game operations at, and/or associated with, gaming venue 510. Additional gaming venues may require additional distributor servers. Network components 302 of the centralized gaming system 304 support a mobile wagering sub-system that is modular and scalable.

Figure 1A:
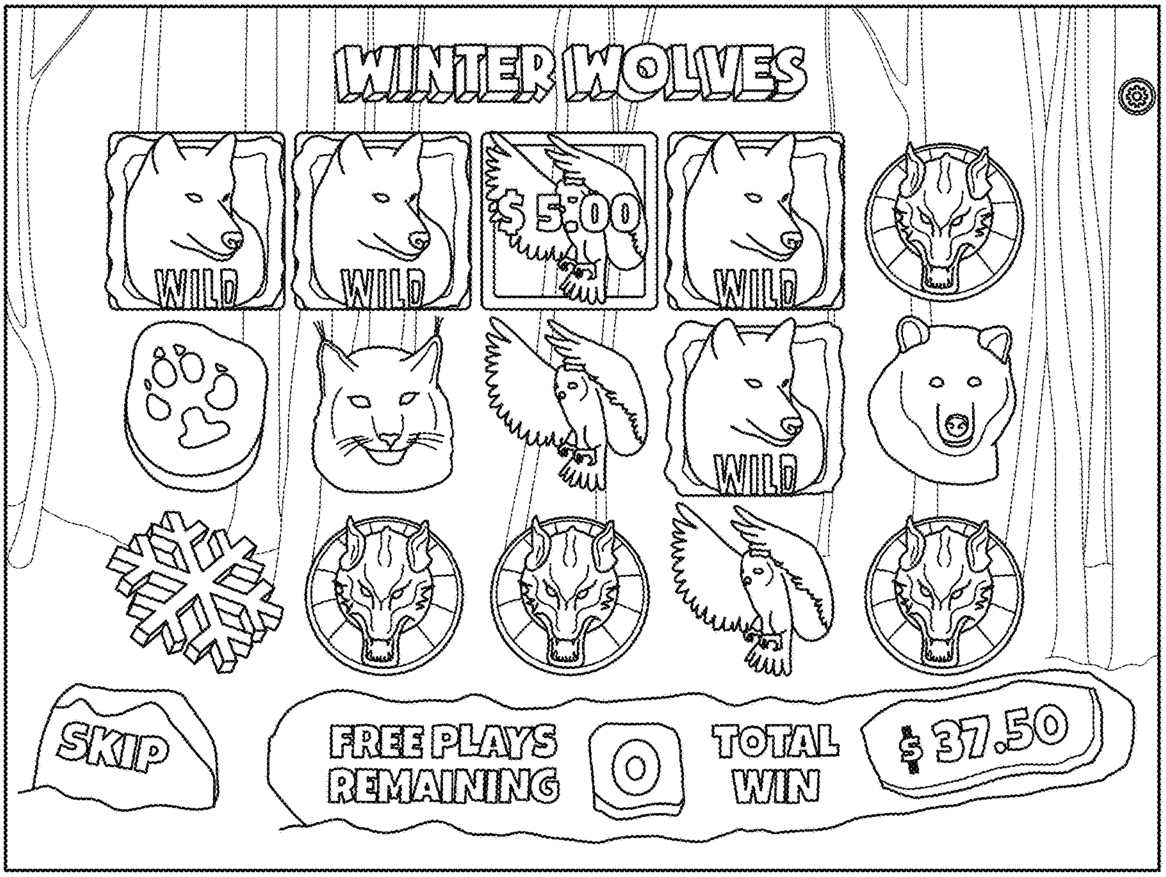
FIG. 1A shows an illustrative game display graphical rendering of a $100.00 winning ticket for a 5×3 game grid.
Figure 1B:
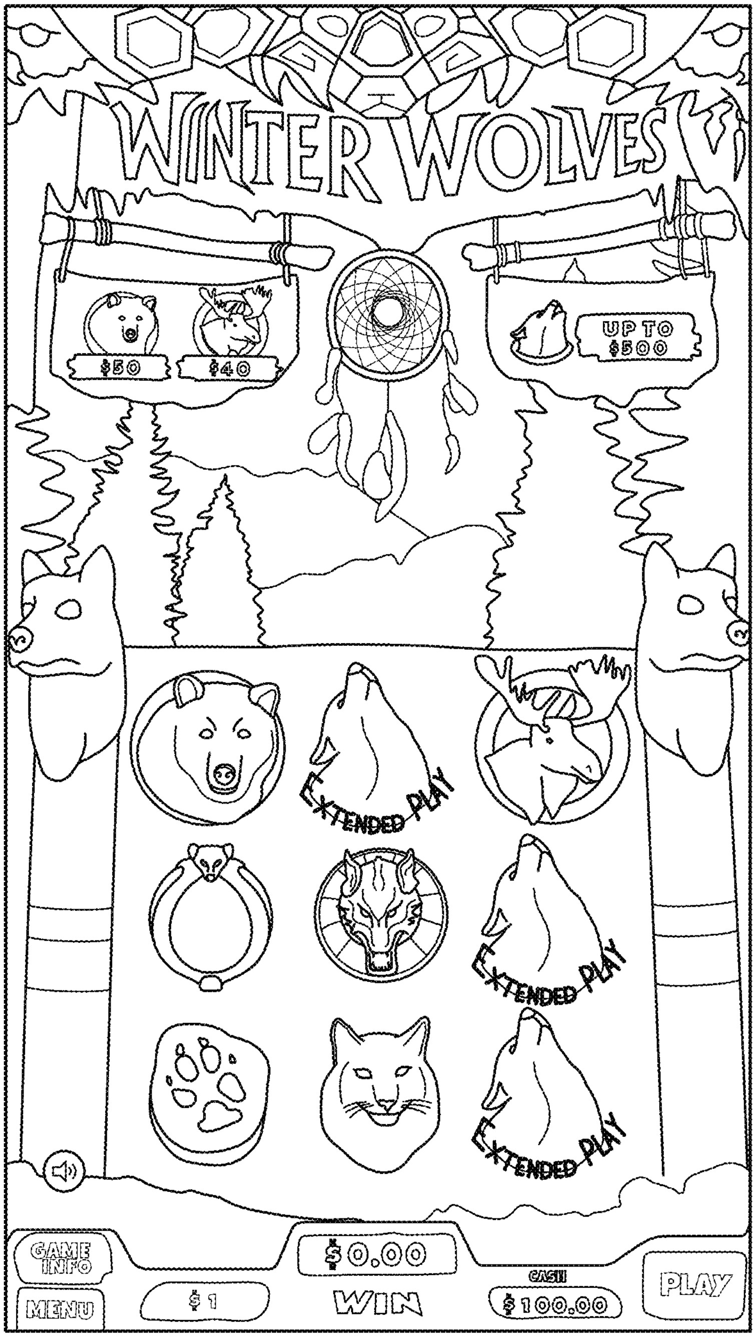
FIG. 1B shows an illustrative game display graphical rendering of a $100.00 winning ticket for a 3×3 game grid.

The centralized resource server 502 performs a variety of tasks including, but not limited to, providing a central routing operation for each of the mobile devices 310, 312, 314 or 316 (shown in FIG. 1) so that each mobile device is routed to the proper distributor server 504*a* or 504*b* upon activation of each mobile device.

By way of example and not of limitation, the first request generated by a mobile device 400 may direct the mobile device 400 to an illustrative distributor server associate with authorized location 324. With respect to personal device 310, the centralized resource server 502 may validate the location of the mobile device 310 (e.g., determine that the mobile device is within or at a gaming venue) before allowing it to operate with the central gaming system 304.

Additionally, the centralized resource server 502 may be configured to provide a central routing operation for a cashier authentication corresponding to POS device 314. Thus, a POS device 314 may be authenticated by the appropriate distributor server 504*a* or 504*b*, which may then forward the authentication to an appropriate distributor server 504*a* or 504*b*.

The centralized resource server 502 may also be configured to operate as a central authority for generation and distribution of finite decks of predetermined intelligent electronic pull-tab tickets and associated results. It may also support processes which enable play of games involving multiple client devices on multiple distributors, such as linked bingo tournaments. The centralized resource server 502 may be configured to operate as a central authority for generation and distribution of random slot pulls, poker hands, and/or card draws for slot machine game embodiments and video poker game embodiments.

The centralized resource server 502 may also manage and control financial information with a centralized database 512, which stores data generated by the cashiers, mobile devices, and the various gaming venues. The centralized database 512 provides a central repository for accounting data, game play data, system configuration data, and other such data types. In some embodiments, the centralized database 512 also stores graphical renderings, wherein each game rendering includes a variety of attributes, such as an associated game theme, wager amount, award value, and hardware profile, such that the database may be searchable for any one or more of these attributes. A rendering module 503 included in the centralized resource server 502 may search and/or generate the graphical renderings in the database 512. The graphical renderings may display symbols in a 3×3 grid, such as a slot machine reel display. The graphical renderings may display symbols in a 5×3 grid, such as a slot machine reel display. The graphical renderings may be formatted for landscape display, such as by formatting the graphical rendering in a landscape aspect ratio. The graphical renderings may be formatted for portrait display, such as by formatting the graphical rendering in a portrait aspect ratio.

The illustrative distributor servers 504 are communicatively coupled to the centralized resource server 502. Each of the distributor servers 504 may be configured to manage finances for the player accounts that are associated with the mobile devices. Additionally, the illustrative distributor servers 504 may be responsible for generating logs and reports required for centralized reporting, as well as for POS devices. Furthermore, the illustrative distributor servers 504 may be configured to manage game play operations, wagers, and prizes. Further still, the illustrative distributor servers 504 may manage cashier operations including customer sales and redemptions. Further yet, the distributor servers 504 may be configured to maintain the financial status for the mobile devices, including the actual credit balance on each player device.

In another embodiment, the operations performed by the centralized resource server 502 and the distributor servers 504 may be performed by a centralized resource software module (not shown) and a distributor software module (not shown) that may be associated with a client-server architecture, a distributed architecture, a peer-to-peer architecture, a hierarchical architecture, a “cloud” architecture or any combination thereof.

The mobile wagering sub-system 306 may also include an illustrative web portal server 514. The web portal server 514 provides a web interface to access system accounting, financial reporting and operational data, as well as to maintain and configure the system. The web portal server 514 is configured to support creating, editing and removing entities like distributors, operators, venues, cashiers, devices, game parameters and others as required. All actions performed on the portal 514 are logged for auditing purposes. This action log can be accessed on the portal 514 itself if the user has the appropriate system privileges.

By way of example and not of limitation, the web portal server 514 may be accessed from personal computers or tablet devices 518 over the internet. Authorized users having "administrator" privileges may access system reports and controls based upon their operational needs and organizational affiliation. The web portal server 514 supports a variety of different authorized users having different roles with different levels of access to the mobile wagering sub-system 306. For example, the web portal server may be configured to support the following roles: regulator, manufacturer, distributor with access to multiple operators, operator with access to multiple venues, a particular venue, a particular cashier and other such preconfigured roles. Other roles and associated access privileges may be created as determined by regulatory and operational needs.

An illustrative router 516 also communicates with the mobile wagering sub-system 306. The router 516 is communicatively coupled to a wide area network 420, e.g. Internet, which is communicatively coupled to the various venues and authorized users. Additionally, the illustrative router 516 is communicatively coupled to the portal server 514, each distributor server 504*a* and 504*b*, and the centralized resource server 502. The router 516 forwards data packets to the appropriate network component such as a server, a network, an internet appliance, a sub-system and other such network components. Additionally, the router 516 may include a firewall that supports secure communications with the mobile wagering sub-system 306.

Referring now to FIG. 6, there is shown an illustrative gaming venue schematic 600. The gaming venue schematic 600 contemplates only gaming transactions performed within the confines of a gaming venue 608. At the gaming venue 608, a point-of-sale (POS) device 602 is communicatively coupled to one or more mobile devices 604 and 606 in a gaming venue 608. In the illustrative embodiment, mobile device 604 is a personal mobile device within the confines of the gaming venue 608 and mobile device 606 is a venue-provided mobile device within the confines of the gaming venue 608. By way of example and not of limitation, the illustrative POS device 602 is communicatively coupled to mobile devices 604 and 606 with a native Socket implementation inside a Local Area Network (LAN). An exploded view of an illustrative user interface 610 corresponding to POS device 602 is also shown. An exploded view of an illustrative user interface corresponding to mobile device 604 is also shown.

The POS device 602 may be configured to manage all cash operations such as cash-in operations and cash-out operations. The cash-in and cash-out operations may be requested by the mobile devices 604 and 606, the POS 602, or any combination thereof. In the Illustrative embodiment, the POS device 602 is configured to receive a cash amount. The POS device 602 also receives an instruction to associate the cash amount with the personal mobile device 604 that shares the same device identifier with the personal mobile device 604 and the POS device 602 (e.g., the instructions indicate a device identifier on the POS device 602, the device identifier associated with personal mobile device 604). For example, the phrase "MY NAME" may be presented as a device identifier on the mobile gaming device 604, and on the POS 602. The personal mobile device 604 may then proceed to communicate the cash amount to the POS device 602, which then initiates the funding transaction to the network component when payment has been confirmed. Where the payment is a cash payment, a cashier may provide a physical confirmation that the cash payment has been received. Where the payment is a credit/debit card payment, a payment processor may provide an electronic confirmation that the credit/debit payment has been authorized and/or approved.

The POS device 602 generates a confirmation instruction that confirms that the device identifier indicated on the POS device 602 is the same device identifier associated with the personal mobile device 604 that is in the possession of the particular user that provided the cash amount or card payment. In operation, the POS device 602 receives an instruction to associate the cash amount or card payment with the personal mobile device 604 that shares the same device identifier with the personal mobile device 604 and the POS device 602 (i.e., an instruction to associate the cash amount or card payment with a personal mobile device having a device identifier matching the device identifier indicated on the POS device 602). The POS device 602 communicates the device identifier, the unique session identification and the cash amount or card payment to the network component.

The illustrative POS device 602 and mobile device 604 may be embodied as personal mobile device 312, while mobile device 606 may be embodied as venue-provided device 316, which are described above in FIG. 3C. The illustrative POS device 602 is a client device configured to receive and operate a proprietary POS software component, e.g., a downloadable application.

The mobile devices 604 and 606 are client devices configured to receive and operate a proprietary game application. The illustrative POS device 602 and mobile devices 604 and 606 are communicatively coupled with the mobile wagering sub-system 306. In the illustrative embodiment, the client devices communicate with the mobile wagering sub-system 306 for each transaction. More generally, all wagering and accounting information is monitored and stored in the centralized gaming system 304 and the client devices reflect the information received from the centralized gaming system 304. For reasons of security and consistency all game play decisions and financial data are hosted in the centralized gaming system 304 and only visually reflected in the client devices.

The illustrative wide area network 322, e.g., Internet, (shown in FIG. 3C) is communicatively coupled to the illustrative gaming venue 608, which may constitute a gaming venue 324 or be located within a gaming venue 324. In the illustrative embodiment, the illustrative wide area network terminates at Router A 611. The illustrative Router A 611 may be a pre-existing router located at the venue 608 and usable for multiple purposes, depending on the needs of the venue. For example, Router A 611 may be a component of a cable TV system. In the illustrative embodiment, a second Router B 612 is also communicatively coupled to router A 611. Illustrative Router B 612 is configured to support the requirements for communications with the mobile wagering sub-system 306. In some embodiments, there may be a single router which performs the functions of Router A and Router B.

In the illustrative embodiment, router B 612 establishes two private Wi-Fi SSIDs to be used only at a specific site. Each Wi-Fi SSID includes a security key that is unique to that site and is not available to site personnel. One SSID may be reserved for the exclusive use of the mobile wagering sub-system 306 and a second SSID may be provided for exclusive use of other system applications.

The illustrative POS device 602 is an electronic device that may be operated by a cashier in the venue 608. The POS device 602 provides control over financial activity within the venue 608. An illustrative POS Application program operating on the POS device 602 supports the following illustrative operations: a cash-in operation (sales), a cash-out operation (redemption), a ticket purchase operation (wagering), and a reporting operation.

In the illustrative embodiment, the cashier logs into the POS application program by providing a cashier username and password. During the set-up process, the cashier name is associated with a cashier role that is associated only with a particular venue, such as venue 608. After a successful login, the POS client retrieves relevant system information from an illustrative distributor server 504, which presents the user interface 610.

The illustrative user interface 610 associated with POS client 602 presents colored icons, in which each icon represents one of the mobile devices (such as mobile devices 604 and 606) in the venue 608. Note that the illustrative authorized mobile devices 604 and 606 may also be referred to as "a registered gaming client." By way of example, each icon 618 has a short identifier representing the local identification of the device, which is unique within that venue. For example, a grey icon may identify that the mobile device has been registered with the mobile wagering sub-system; however, the mobile device is not currently available for game play. Another illustrative icon may be a yellow icon, which represents that the mobile device is present and available. A green icon may represent that the mobile device has credit and is involved in a ticket. A red icon may represent that a player input has been received that relates to a HELP button input command, a cash selection input command, a cash output command, or a game purchase selection. When a personal mobile device 310 or 312 is identified in venue 608, the POS device 602 will be notified by the network component 302 and the POS device will display a new icon 620 which will represent the new device. The new device may be identified with a display of the device identifier, as received from the network component.

In operation, a cashier interacts with the user interface 610 and selects an icon associated with a particular mobile device. After selecting the appropriate mobile device, the user interface enables the cashier to add cash to the mobile device, to cash-out a player from the mobile device, to make a game purchase associated with the player's mobile device, and to display a log of recent play and transactional activity and other operational functions as may be required in various implementations.

The add cash process may include a cash selection input that is associated with the mobile application operating on the personal mobile device 312 or the venue-provided mobile device 316. The cash selection input is received by the mobile application, which is then communicated to the network component associated with the mobile wagering sub-system 306. The network component associated with the mobile wagering sub-system 306 then communicates the cash selection input to the POS device 608.

The cash-out process may include a cash-out selection input that is associated with the mobile application operating on the personal mobile device 312 or the venue-provided mobile device 316. The cash-out selection input is received by the mobile application, which is then communicated to the network component associated with the mobile wagering sub-system 306. The network component associated with the mobile wagering sub-system 306 then communicates the cash-out selection input to the POS device 608.

The game purchase process may include a game play and/or wagering selection input(s) that is associated with the mobile application operating on the personal mobile device 312 or the venue-provided mobile device 316. The game play and/or wagering selection input(s) is received by the mobile application, which is then communicated to the network component associated with the mobile wagering sub-system 306. The network component associated with the mobile wagering sub-system 306 may then communicate the game play and/or wagering selection input(s) to the POS device 608.

The illustrative POS client 602 is communicatively coupled to centralized resource server 502, the distributor server 504 or any other such network components.

A variety of other user interfaces may also be presented on the POS device 602. For example, a user interface may be presented that allows the illustrative cashier to access reports and to log-out from the POS device 602. For example, a reports screen may be presented that summarizes the business activity of the current day, the previous day or a historical period. The reports may include data regarding cash-in sales (in dollars), games purchased and/or wagers made, unredeemed tickets, awarded prizes (in US Dollars), and net revenue, which is the difference between the cash-in sales and the awarded prizes. The illustrative reports screen may be refreshed in real-time or in pseudo real-time.

With reference now to FIG. 7, there is shown an illustrative method 700 for the generation and distribution of intelligent electronic pull-tab game sessions (i.e., electronic tickets). The method 700 begins at step 702 where the centralized gaming system 304 randomly generates one or more decks of intelligent electronic pull-tab tickets. Each deck includes a plurality of intelligent electronic pull-tab tickets, wherein each intelligent electronic pull-tab ticket has several attributes including a ticket identifier, a wager amount, an assigned award value, a game theme or design, and a plurality of associated graphical renderings. In some embodiments, the centralized gaming system 304 randomly generates a deck of intelligent electronic pull-tab tickets such that the deck includes a particular number (i.e., a finite number) of game sessions/tickets, a particular number of winning tickets, a particular total value of ticket prizes, a particular number of winning tickets having a certain award value, and any combination thereof. During or upon generation of a deck of intelligent electronic pull-tab tickets, the centralized gaming system 304 assigns the various attributes of a ticket identifier, a wager amount, an assigned award value, a game theme or design, and a plurality of associated graphical renderings to each intelligent electronic pull-tab ticket. In some embodiments, the plurality of associated graphical renderings are generated and/or assigned by the rendering module 303 or 503.

The ticket identifier may be a number or an alphanumeric code that is unique to each intelligent electronic pull-tab ticket. The ticket identifier may also identify the particular deck to which an intelligent electronic pull-tab ticket assigned or from which the ticket originates. Upon generation at the centralized gaming system 304, each attribute of an intelligent electronic pull-tab ticket may be stored in association with the ticket identifier, such as in database 512 (shown in FIG. 4).

The wager amount attribute is the credit and/or dollar amount required for a player to purchase the intelligent electronic pull-tab ticket. As such, the wager amount is a public attribute that is displayed and made known to a player or any other viewer at all times, such as prior to purchase. The wager amount may be any commonly used wager amount for either electronic or paper pull-tab tickets, such as, but not limited to, $1, $2, $5, or $25. In an illustrative embodiment shown in FIGS. 1A, the electronic pull-tab ticket 100*a* has a $0.50 (or ¢50) wager amount.

The assigned award value is a prize value that may be a credit and/or dollar amount associated with a result of the intelligent electronic pull-tab ticket. As such, the assigned award value is a private and/or confidential attribute that is NOT displayed or made known to a player or any other viewer prior to purchase or a gameplay action, such as a player input instructing a gaming application operating on a gaming device to reveal the game result of a purchased intelligent electronic pull-tab ticket. In some embodiments, the award value is one or more bonus game sessions/tickets. In an illustrative embodiment, the assigned award value is $100.00.

The game theme or design may be an attribute shared by all intelligent electronic pull-tab tickets in a particular deck. The game theme may include a game title associated with all intelligent electronic pull-tab tickets in a particular deck. And as such, the game theme may be a public attribute that is displayed and made known to a player or any other viewer at all times, such as prior to purchase. The game theme may include a particular design of the various symbols displayed in a game result. In the illustrative and non-limiting embodiment shown in FIGS. 1A and 1B, there are shown electronic pull-tab tickets 100*a* and 100*b* having the Winter Wolves game theme. The Winter Wolves game theme is characterized by the snowy winter forest background, ice-like text, and the various winter animals and objects including the reel symbols: wild wolves, wolf shields, extended play wolves, lynxes, snowflakes, owls, paw prints, brown bears, black bears, and moose. As such, other game themes may have different backgrounds, text formats, and symbols or symbol-types.

The graphical renderings include both the game theme and the particular arrangement of symbols to represent the award value associated with the intelligent electronic pull-tab ticket. As such, one or more graphical rendering may be associated with a particular award value, theme, wager amount, and any combination thereof. For example, referring back to FIGS. 1A and 1B, there are shown two graphical renderings 100*a* and 100*b* that may be associated with a single intelligent electronic pull-tab ticket. As described above, graphical renderings 100*a* and 100*b* have the same theme, wager amount, and award value, and thus can be issued to a single player for a single purchased ticket, where only one graphical rendering is displayed to the player. The different symbols, winning pattern, and background of the two graphical renderings 100*a* and 100*b* are designed to fit disparate screens/formats for different gaming devices that the player may be operating. Graphical rendering 100*a* is formatted for screens having a 4:3 aspect ratio, while graphical rendering 100*b* is formatted for screens having a 9:16 aspect ratio. Each graphical rendering 100*a* and 100*b* may be associated with one or more hardware profiles identifying screen size/format or other hardware identification that indicates the type of gaming device for which the graphical rendering is intended, i.e., to be displayed by and/or upon. The hardware profile may be a code, identification number, device list, descriptive text, and any combination thereof.

In some embodiments, the centralized gaming system 304 selects the graphical rendering(s) for inclusion in a generated electronic ticket from a library or database of graphical renderings by searching for graphical renderings corresponding to the theme, wager amount, and award value of the generated electronic ticket. For example, a library of graphical renderings may include several graphical renderings for a particular combination of theme, wager amount, and award value, where only one of the several graphical renderings existed for each of several different hardware profiles (i.e., there exists only one graphical rendering for each combination of theme, wager amount, award value, and hardware profile in the library). In some embodiments, each graphical rendering may further be associated with and/or include an identifying code indicating the game theme, wager amount, and award value of electronic tickets represented by the graphical rendering.

Upon generation of one or more decks of intelligent electronic pull-tab tickets by the centralized gaming system 304, the method proceeds to step 704. At step 704, a gaming device communicatively coupled to the centralized gaming system 304 transmits a message to the centralized gaming system 304 requesting one or more intelligent electronic pull-tab ticket. For fixed gaming devices (i.e., cabinets, slot machines, EGMs, etc.) the message transmission may be accomplished through wired networks, wireless networks, or a combination thereof. For mobile gaming devices (i.e., tablets and smartphones, both venue-provided and personal) the message transmission may be accomplished through wireless networks or a combination of wireless networks and wired networks. For example, with reference back to FIGS. 3, 5, and 6, mobile devices 606 and 604 must first wirelessly transmit request messages to Router B 612, which then passes the messages over a wired network to Router A 611, and from Router A 611 through a WAN 520 or the Internet 322 to the centralized gaming system 304.

The request message may include a timestamp, information identifying the requesting gaming device, a location of the requesting gaming device, information identifying the user of the requesting gaming device, a wager amount, and a deck from which a requested intelligent electronic pull-tab ticket is to be selected.

The timestamp is a numeric value indicating the time at which the request message was transmitted from the requesting gaming device. This timestamp may be used by the centralized gaming system to assign an order of request priority when multiple gaming devices at disparate locations are requesting electronic tickets from the same deck. In such embodiments, gaming devices with larger transmission paths may make a request before another gaming device with a shorter transmission path, but the later request may be received before the earlier request due to their relative transmission paths and associated transmission times. The timestamp may also be used for accounting, auditing, and/or regulatory compliance purposes.

The information identifying the requesting gaming device may include a request authorization, an identification number or code, and any combination thereof. In some embodiments, the identifying information may include a hardware profile corresponding to the requesting gaming device that is used by the central gaming system 304 to confirm that the requesting gaming device is capable of receiving and displaying the requested electronic ticket.

The location of the requesting gaming device may be GPS data, a street address, a gaming venue identifier, or third-party location information indicating the geographic location of the requesting gaming device. The centralized gaming system 304 may use the location information to determine whether the gaming device is authorized to request an electronic ticket.

The information identifying the user of the requesting gaming device may include a registered player name, a username, a code, an online account, a loyalty account, and any combination thereof.

The wager amount is a purchase value for one or more intelligent electronic pull-tab tickets requested by the requesting gaming device and/or player. The wager amount may correspond to the deck from which the requested intelligent electronic pull-tab ticket is to be selected (i.e., every electronic ticket in a deck has the same required wager amount/purchase price).

The deck from which a requested intelligent electronic pull-tab ticket is to be selected may be identified by a deck identifier, which is a number, alphanumeric, a code, a theme, and any combination thereof. Thus, the deck identifier may associate intelligent electronic pull-tab tickets with a finite deck. In some embodiments, a deck identifier must be included in the request message, as there may be multiple decks administered by the centralized gaming system 304 that have the same required wager amount and/or theme. Further, when multiple decks having the same wager amount and/or theme are available for play, a player may want an electronic ticket from a particular deck based upon: the prizes known to have been won or not won from that deck, the number of tickets remaining in the deck, the total number of tickets from which the deck was originally composed, and any combination thereof.

Upon receiving a valid request message, the method proceeds to step 706. At step 706, the centralized gaming system 304 randomly selects one or more intelligent electronic pull-tab ticket from the deck(s) associated with the request. For example, where a request message specifies one intelligent electronic pull-tab ticket for a wager amount of $1 from a Winter Wolves deck, the centralized gaming system 304 may randomly select one intelligent electronic pull-tab ticket from a particular $1 Winter Wolves deck or any one of a plurality of $1 Winter Wolves decks. For another example, where a request message specifies one intelligent electronic pull-tab ticket for a wager amount of $1 from a Winter Wolves deck, the centralized gaming system 304 randomly selects one intelligent electronic pull-tab ticket for a $1 wager amount from a Winter Wolves deck includes a plurality of tickets having one of several wager amounts including a $1 wager amount.

In some embodiments of step 706, the deck(s) associated with the request were generated and/or assembled in a random order, and the centralized gaming system 304 merely selects one or more intelligent electronic pull-tab ticket from those deck(s) sequentially. For example, where a request message specifies one intelligent electronic pull-tab ticket for a wager amount of $1 from a Winter Wolves deck, the centralized gaming system 304 selects a next available intelligent electronic pull-tab ticket from a randomized sequence of tickets in a $1 Winter Wolves deck. For another example, where a request message specifies one intelligent electronic pull-tab ticket for a wager amount of $1 from a Winter Wolves deck, the centralized gaming system 304 randomly selects one intelligent electronic pull-tab ticket from a sequence of intelligent electronic pull-tab tickets in one or more $1 Winter Wolves deck. In another example, where a request message specifies one intelligent electronic pull-tab ticket for a wager amount of $1 from a Winter Wolves deck, the centralized gaming system 304 randomly selects one intelligent electronic pull-tab ticket for a $1 wager amount from a Winter Wolves deck that includes a sequence of a plurality of tickets having one of several wager amounts including a $1 wager amount.

At step 708, the centralized gaming system 304 transmits the selected electronic ticket(s) associated with the request to the requesting gaming device. Similar to step 704, the selected electronic ticket(s) are transmitted by the centralized gaming system 304 through wired networks, wireless networks, or a combination thereof.

When the gaming device receives the requested electronic ticket(s), the method proceeds to decision diamond 710. At decision diamond 710, the receiving gaming device reviews the graphical renderings and/or hardware profiles associated with the received electronic ticket(s) to identify the graphical rendering corresponding to a hardware profile that matches the hardware profile of the gaming device. In some embodiments, the hardware profile may include a model number identifying the specifications of the gaming device. For example, where the requesting gaming device is a venue-provided mobile tablet with a 4:3 screen aspect ratio, such as an 11" iPad with a resolution of 264 pixels/in (PPI), the hardware profile included in the request message may indicate an aspect ratio of 4:3, a screen size, a PPI, a 3D rendering capability, a required amount of available memory, or any combination thereof. This process may be performed sequentially, where the gaming device reviews each graphical rendering in turn and identifies the hardware profile associated with that graphical rendering.

In this sequential embodiment, when the gaming device compares the hardware profile associated with an electronic ticket to the hardware profile of the gaming device and finds that the hardware profiles do NOT match, the method proceeds to step 712 where the gaming device determines NOT to display the graphical rendering. From step 712, the method then proceeds back to decision diamond 710 for consideration of the next graphical rendering in the sequential review.

When the gaming device identifies a graphical rendering having a hardware profile matching the hardware profile of the gaming device, the method proceeds to step 714. At step 714, the gaming device displays to the player the graphical rendering having the hardware profile matching the gaming device's hardware profile and the method terminates.

Figure 8A:
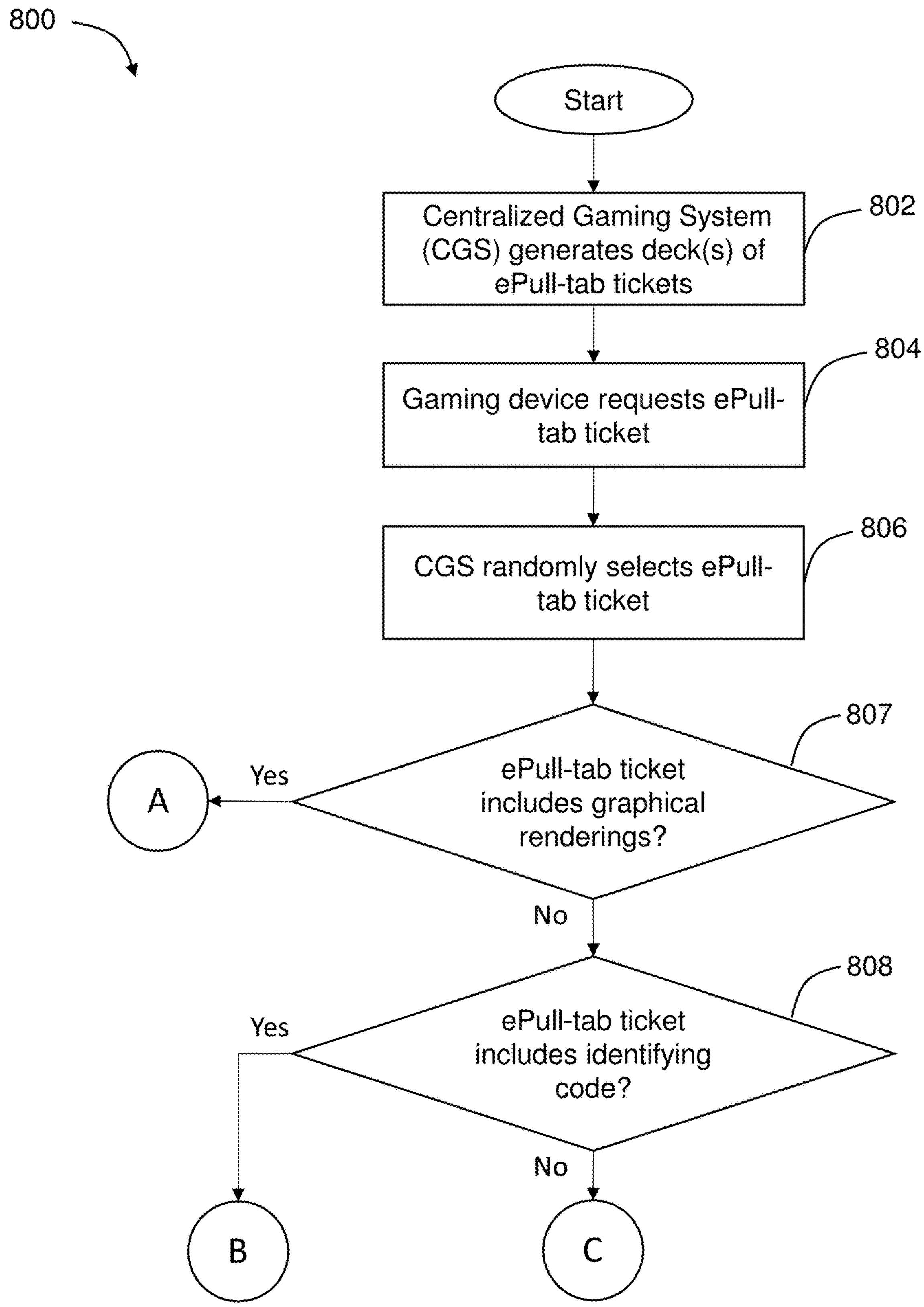
Figure 8B:
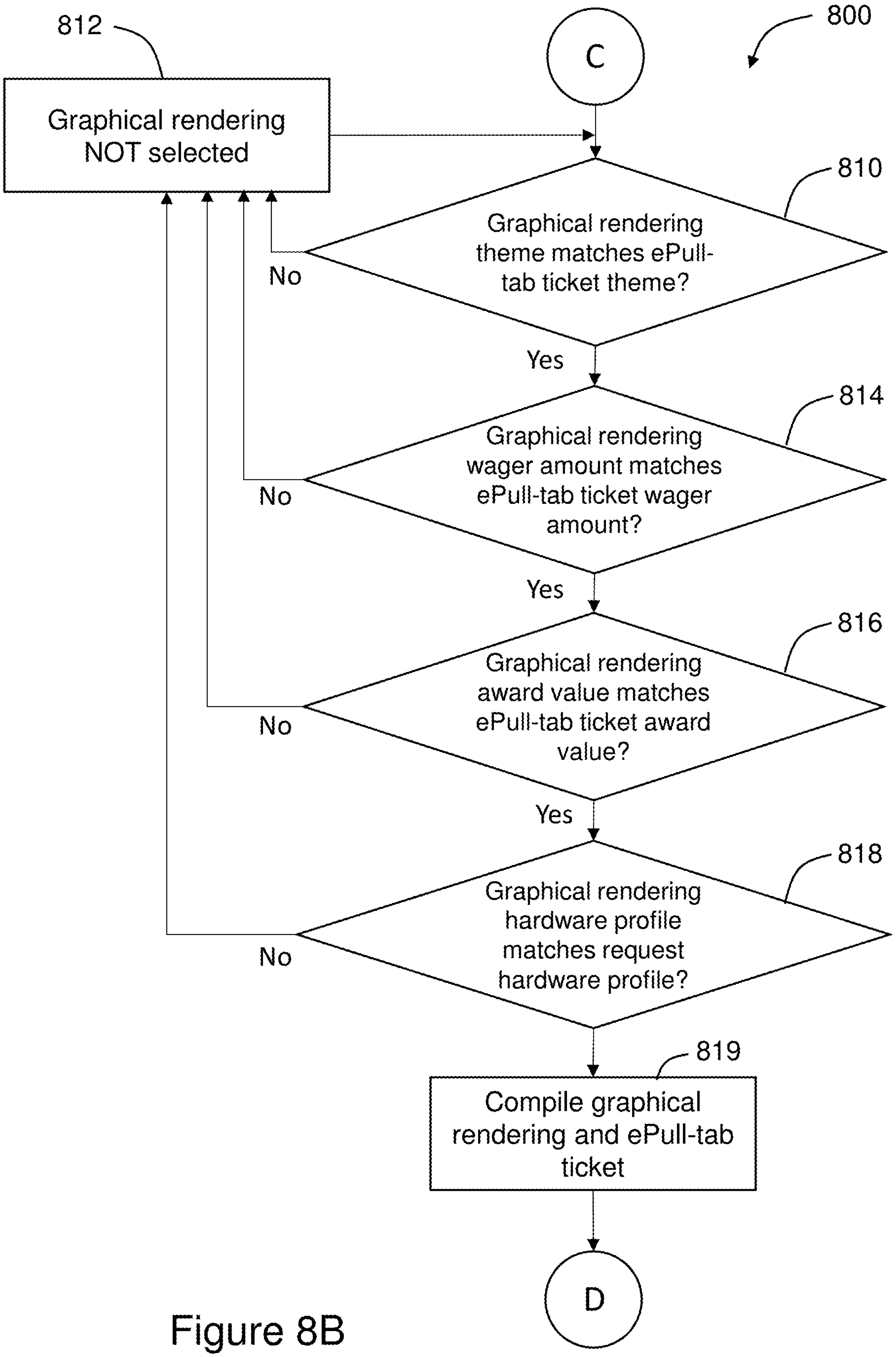
Figure 8C:
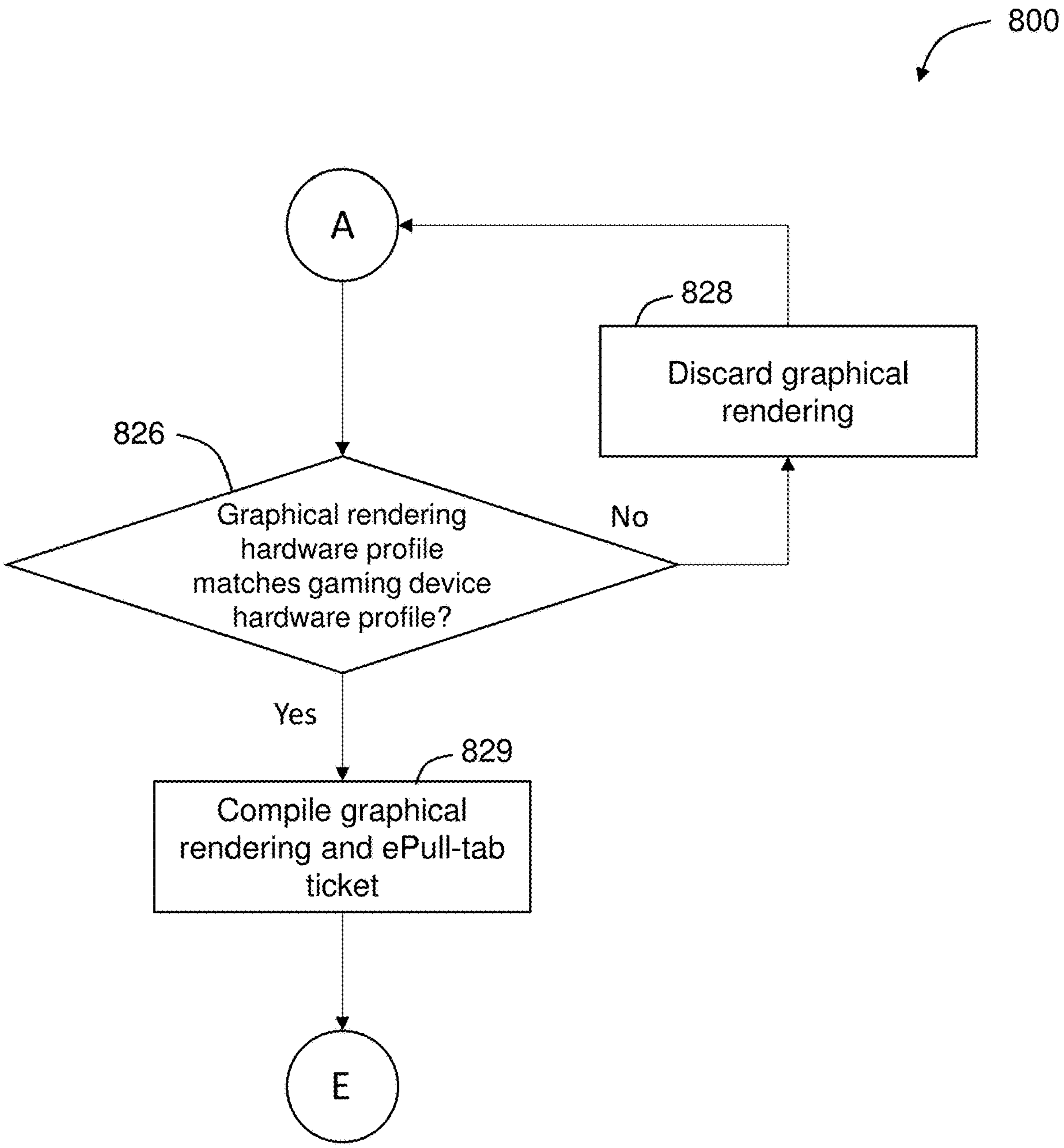
Figure 8D:
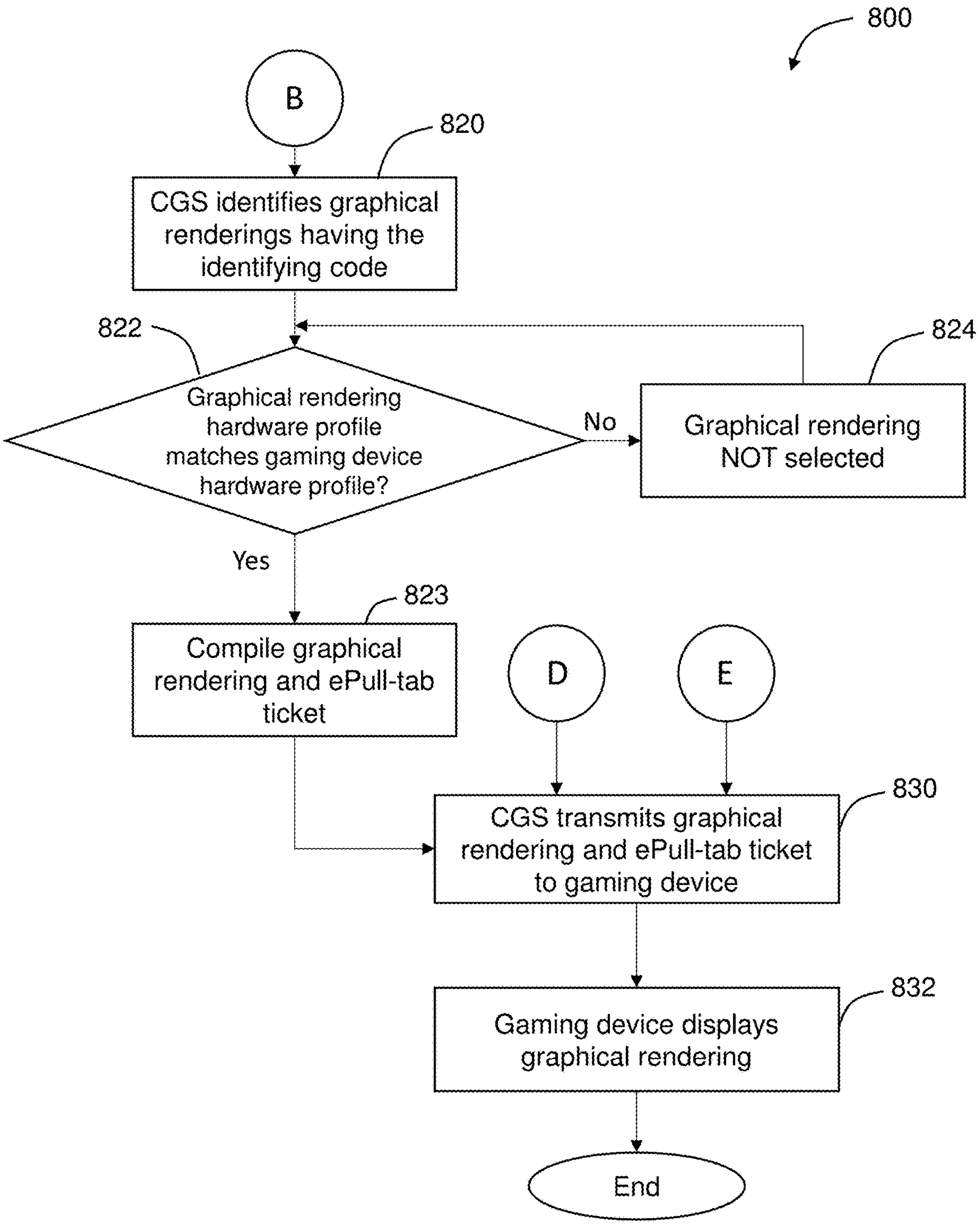

Referring now to FIGS. 8A-C, there is shown another illustrative method 800 for the generation and distribution of intelligent electronic pull-tab game sessions (i.e., electronic tickets). The method 800 begins at step 802 in FIG. 8A where the centralized gaming system 304 randomly generates one or more decks of intelligent electronic pull-tab tickets. Each deck includes a plurality of intelligent electronic pull-tab tickets, wherein each intelligent electronic pull-tab ticket has several attributes including a ticket identifier, an identifying code, a wager amount, an assigned award value, and a game theme or design. The identifying code may include a number, alphanumeric, or descriptive text identifying the theme, wager amount, and award value to the system. As is described in more detail below, the identifying code may be used by the system to aid in the identification of the graphical rendering(s) corresponding to a particular electronic ticket. During or upon generation of a deck of intelligent electronic pull-tab tickets, the centralized gaming system 304 assigns the various attributes of a ticket identifier, a wager amount, an assigned award value, and a game theme or design to each intelligent electronic pull-tab ticket. In some, embodiments, the centralized gaming system 304 further assigns an identifying code to each intelligent electronic pull-tab ticket. In some embodiments, a rendering module 303 or 503 generates and/or assigns one or more graphical rendering to each electronic ticket generated by the centralized gaming system 304.

Upon generation of one or more decks of intelligent electronic pull-tab tickets by the centralized gaming system 304, the method proceeds to step 804. At step 804, a gaming device communicatively coupled to the centralized gaming system 304 transmits a message to the centralized gaming system 304 requesting one or more intelligent electronic pull-tab ticket. For fixed gaming devices (i.e., cabinets, slot machines, EGMs, etc.) the message transmission may be accomplished through wired networks, wireless networks, or a combination thereof. For mobile gaming devices (i.e., tablets and smartphones, both venue-provided and personal) the message transmission may be accomplished through wireless networks or a combination of wireless networks and wired networks.

The request message may include a timestamp, a hardware profile, information identifying the requesting gaming device, a location of the requesting gaming device, information identifying the user of the requesting gaming device, a wager amount, and a deck from which a requested intelligent electronic pull-tab ticket is to be selected.

Upon receiving a valid request message, the method proceeds to step 806. At step 806, the centralized gaming system 304 randomly selects one or more intelligent electronic pull-tab ticket from the deck(s) associated with the request. In some embodiments of step 806, the deck(s) associated with the request were generated and/or assembled in a random order, and the centralized gaming system 304 merely selects one or more intelligent electronic pull-tab ticket from those deck(s) sequentially.

At decision diamond 807, the centralized gaming system 304 begins the process of selecting a graphical rendering to associate with the selected intelligent electronic pull-tab ticket(s) by determining whether the electronic ticket(s) include any associated graphical renderings. When the centralized gaming system 304 determines that the selected intelligent electronic pull-tab ticket(s) do include associated graphical renderings, the method proceeds to decision diamond 826 (shown in FIG. 8C). When the centralized gaming system 304 determines that the selected intelligent electronic pull-tab ticket(s) do NOT include associated graphical renderings, the method proceeds to decision diamond 808.

At decision diamond 808, the centralized gaming system 304 continues the process of selecting a graphical rendering to associate with the selected intelligent electronic pull-tab ticket(s) by determining whether the electronic ticket(s) include an identifying code. When the electronic ticket(s) does include an identifying code, the method proceeds to step 820 (shown in FIG. 8D). When the electronic ticket(s) does NOT include an identifying code, the method proceeds to decision diamond 810 (shown in FIG. 8B).

At decision diamond 810, the centralized gaming system 304 and/or the rendering module 303 reviews a library or database of graphical renderings to identify one or more graphical renderings corresponding to the game theme of the electronic ticket(s). This process may be performed sequentially, where the centralized gaming system 304 and/or the rendering module 303 reviews each graphical rendering in turn and identifies the game theme associated with that graphical rendering.

In this sequential embodiment, when the centralized gaming system 304 and/or the rendering module 303 compares the game theme associated with a graphical rendering to the game theme of an electronic ticket and finds that the game themes do NOT match, the method proceeds to step 812 where the centralized gaming system 304 and/or the rendering module 303 determines NOT to select the graphical rendering. From step 812, the method then proceeds back to decision diamond 810 for consideration of the next graphical rendering in the sequential review.

When the centralized gaming system 304 and/or the rendering module 303 identifies a graphical rendering having a game theme matching the game theme of the electronic ticket, the method proceeds to decision diamond 814.

At decision diamond 814, the centralized gaming system 304 and/or the rendering module 303 compares wager amount associated with the identified graphical rendering to the wager amount of the electronic ticket. When the wager amounts do NOT match, the method proceeds to step 812 where the centralized gaming system 304 and/or the rendering module 303 determines NOT to select the graphical rendering. From step 812, the method then proceeds back to decision diamond 810 for consideration of the next graphical rendering in the sequential review.

When the centralized gaming system 304 and/or the rendering module 303 identifies a graphical rendering having a wager amount matching the wager amount of the electronic ticket, the method proceeds to decision diamond 816.

At decision diamond 816, the centralized gaming system 304 and/or the rendering module 303 compares award value associated with the identified graphical rendering to the award value of the electronic ticket. When the award values do NOT match, the method proceeds to step 812 where the centralized gaming system 304 and/or the rendering module 303 determines NOT to select the graphical rendering. From step 812, the method then proceeds back to decision diamond 810 for consideration of the next graphical rendering in the sequential review.

When the centralized gaming system 304 and/or the rendering module 303 identifies a graphical rendering having an award value matching the award value of the electronic ticket, the method proceeds to decision diamond 818.

At decision diamond 818, the central gaming system 304 and/or the rendering module 303 compares the hardware profile associated with the identified graphical rendering to the hardware profile included in the request message from the gaming device. In some embodiments, the hardware profile may include a model number identifying the specifications of the gaming device. For example, where the requesting gaming device is a venue-provided mobile tablet with a 4:3 screen aspect ratio, such as an 11" iPad with a resolution of 264 pixels/in (PPI), the hardware profile included in the request message may indicate an aspect ratio of 4:3, a screen size, a PPI, or any combination thereof.

When the hardware profile associated with the identified electronic ticket does NOT match the hardware profile indicated in the request message, the method proceeds to step 812 where the centralized gaming system 304 and/or the rendering module 303 determines NOT to select the graphical rendering. From step 812, the method then proceeds back to decision diamond 810 for consideration of the next graphical rendering in the sequential review.

When the centralized gaming system 304 and/or the rendering module 303 determines that the identified graphical rendering has a hardware profile matching the hardware profile from the request message, the method proceeds to step 819.

At step 819, the centralized gaming system 304 and/or the rendering module 303 compiles the identified graphical rendering having a hardware profile matching the hardware profile in the request message and the selected electronic ticket into a hardware specific intelligent electronic pull-tab ticket for transmission to the requesting gaming device. Upon generation of the hardware specific intelligent electronic pull-tab ticket, the method 800 proceeds to step 830.

Returning now to step 820 (shown in FIG. 8D), where the centralized gaming system 304 and/or the rendering module 303 has previously determined at decision diamond 808 that a selected electronic ticket includes an identifying code. At step 820, the centralized gaming system 304 and/or the rendering module 303 identifies only and/or all graphical renderings associated with the identifying code of the electronic ticket.

At decision diamond 822, the centralized gaming system 304 and/or the rendering module 303 reviews the identified graphical renderings associated with the identifying code of the electronic ticket to identify one or more graphical renderings corresponding to the hardware profile indicated in the request message. This process may be performed sequentially, where the centralized gaming system 304 and/or the rendering module 303 reviews each identified graphical rendering in turn and compares the hardware profile associated with that graphical rendering to the hardware profile in the request message.

In this sequential embodiment, when the centralized gaming system 304 and/or the rendering module 303 finds that the hardware profiles do NOT match, the method proceeds to step 824 where the centralized gaming system 304 and/or the rendering module 303 determines NOT to select the graphical rendering. From step 824, the method then proceeds back to decision diamond 822 for consideration of the next graphical rendering in the sequential review.

When the centralized gaming system 304 and/or the rendering module 303 identifies a graphical rendering having a hardware profile matching the hardware profile in the request message, the method proceeds to step 823.

At step 823, the centralized gaming system 304 and/or the rendering module 303 compiles the identified graphical rendering having a hardware profile matching the hardware profile in the request message and the selected electronic ticket into a hardware specific intelligent electronic pull-tab ticket for transmission to the requesting gaming device. Upon generation of the hardware specific intelligent electronic pull-tab ticket, the method 800 proceeds to step 830.

Returning now to decision diamond 826 (shown in FIG. 8C) where the centralized gaming system 304 and/or the rendering module 303 has previously determined at decision diamond 807 that a selected electronic ticket includes a plurality of graphical renderings. At decision diamond 826, the centralized gaming system 304 and/or the rendering module 303 reviews the plurality of graphical renderings included in the selected electronic ticket to identify one or more graphical renderings corresponding to the hardware profile indicated in the request message. This process may be performed sequentially, where the centralized gaming system 304 and/or the rendering module 303 reviews each graphical rendering included in the selected electronic ticket in turn and compares the hardware profile associated with that graphical rendering to the hardware profile in the request message.

In this sequential embodiment, when the centralized gaming system 304 and/or the rendering module 303 finds that the hardware profiles do NOT match, the method proceeds to step 828 where the centralized gaming system 304 and/or the rendering module 303 discards the graphical rendering from inclusion in selected electronic ticket. From step 828, the method then proceeds back to decision diamond 826 for consideration of the next graphical rendering in the sequential review.

When the centralized gaming system 304 and/or the rendering module 303 identifies a graphical rendering having a hardware profile matching the hardware profile in the request message, the method proceeds to step 829.

At step 829, the centralized gaming system 304 and/or the rendering module 303 compiles the identified graphical rendering having a hardware profile matching the hardware profile in the request message and the selected electronic ticket into a hardware specific intelligent electronic pull-tab ticket for transmission to the requesting gaming device. The operations in step 829 may include removing any remaining graphical renderings included in the selected electronic ticket that have not yet been discarded through the operations in decision diamond 826 and step 828. The operations of decision diamond 826 and steps 828 and 829 have the effect of stripping away unnecessary and/or erroneous graphical renderings from the selected electronic ticket to generate the hardware specific intelligent electronic pull-tab ticket that includes only the graphical rendering associated with the hardware profile of the gaming device. Upon generation of the hardware specific intelligent electronic pull-tab ticket, the method 800 proceeds to step 830.

At step 830, the centralized gaming system 304 transmits to the requesting gaming device the selected electronic ticket(s) and selected graphical rendering(s) identified as matching the game theme, wager amount, award value of the selected electronic ticket(s) (i.e., identifying code), as well as the hardware profile of the request message. In some embodiments, the centralized gaming system 304 assembles the selected graphical rendering and its associated selected electronic ticket into a ticket package for transmission to the gaming device.

At step 832, the gaming device displays to the player the graphical rendering received in the ticket package and the method terminates.

Referring now to FIG. 9, there is shown another illustrative method 900 for the generation and distribution of intelligent electronic pull-tab game sessions (i.e., electronic tickets). The method 900 begins at step 902 where the centralized gaming system 304 randomly generates one or more decks of intelligent electronic pull-tab tickets. Each deck includes a plurality of intelligent electronic pull-tab tickets, wherein each intelligent electronic pull-tab ticket has several attributes including a ticket identifier, a wager amount, an assigned award value, and a game theme or design. During or upon generation of a deck of intelligent electronic pull-tab tickets, the centralized gaming system 304 assigns the various attributes of a ticket identifier, a wager amount, an assigned award value, and a game theme or design to each intelligent electronic pull-tab ticket. In some, embodiments, the centralized gaming system 304 further assigns an identifying code to each intelligent electronic pull-tab ticket.

Upon generation of one or more decks of intelligent electronic pull-tab tickets by the centralized gaming system 304, the method proceeds to step 904. At step 904, a gaming device communicatively coupled to the centralized gaming system 304 transmits a message to the centralized gaming system 304 requesting one or more intelligent electronic pull-tab ticket. For fixed gaming devices (i.e., cabinets, slot machines, EGMs, etc.) the message transmission may be accomplished through wired networks, wireless networks, or a combination thereof. For mobile gaming devices (i.e., tablets and smartphones, both venue-provided and personal) the message transmission may be accomplished through wireless networks or a combination of wireless networks and wired networks.

The request message may include a timestamp, information identifying the requesting gaming device, a location of the requesting gaming device, information identifying the user of the requesting gaming device, a wager amount, and a deck from which a requested intelligent electronic pull-tab ticket is to be selected.

Upon receiving a valid request message, the method proceeds to step 906. At step 906, the centralized gaming system 304 randomly selects one or more intelligent electronic pull-tab ticket from the deck(s) associated with the request. In some embodiments of step 906, the deck(s) associated with the request were generated and/or assembled in a random order, and the centralized gaming system 304 merely selects one or more intelligent electronic pull-tab ticket from those deck(s) sequentially.

At step 908, the centralized gaming system 304 transmits to the requesting gaming device the selected electronic ticket(s). Upon receiving the selected electronic ticket(s) from the centralized gaming system 304, the method proceeds to decision diamond 910.

At decision diamond 910, the gaming device begins the process of selecting a graphical rendering to associate with the received electronic ticket(s) and display to the player by determining whether the electronic ticket(s) include an identifying code. When the electronic ticket(s) does include an identifying code, the method proceeds to step 922 (shown in FIG. 9C). When the electronic ticket(s) does NOT include an identifying code, the method proceeds to decision diamond 912 (shown in FIG. 9B).

At decision diamond 912, the gaming device reviews a library or database of graphical renderings to identify one or more graphical renderings corresponding to the game theme of the electronic ticket(s). In some embodiments, a rendering module downloaded onto the gaming device reviews the library or database of graphical renderings corresponding to the game theme of the electronic ticket(s). In still other embodiments, the rendering module generates one or more graphical renderings corresponding to the game theme of the electronic ticket(s). The review process may be performed sequentially, where the gaming device and/or rendering module thereon reviews each graphical rendering in turn and identifies the game theme associated with that graphical rendering. In some embodiments, the library or database is accessed over a local area network from a local server. In some embodiments, the library or database is accessed over a wide area network from a remote server. In some embodiments, the library or database was previously downloaded onto the gaming device and accessed from a memory location on-board the gaming device by the rendering module.

In this sequential embodiment, when the gaming device and/or rendering module thereon compares the game theme associated with a graphical rendering to the game theme of an electronic ticket and finds that the game themes do NOT match, the method proceeds to step 914 where the gaming device determines NOT to select the graphical rendering. From step 914, the method then proceeds back to decision diamond 912 for consideration of the next graphical rendering in the sequential review.

When the gaming device and/or rendering module thereon identifies a graphical rendering having a game theme matching the game theme of the electronic ticket, the method proceeds to decision diamond 916.

At decision diamond 916, the gaming device and/or rendering module thereon compares the wager amount associated with the identified graphical rendering to the wager amount of the electronic ticket. When the wager amounts do NOT match, the method proceeds to step 914 where the gaming device and/or rendering module thereon determines NOT to select the graphical rendering. From step 914, the method then proceeds back to decision diamond 912 for consideration of the next graphical rendering in the sequential review.

When the gaming device and/or rendering module thereon identifies a graphical rendering having a wager amount matching the wager amount of the electronic ticket, the method proceeds to decision diamond 918.

At decision diamond 918, the gaming device and/or rendering module thereon compares the award value associated with the identified graphical rendering to the award value of the electronic ticket. When the award values do NOT match, the method proceeds to step 914 where the gaming device and/or rendering module thereon determines NOT to select the graphical rendering. From step 914, the method then proceeds back to decision diamond 912 for consideration of the next graphical rendering in the sequential review.

When the gaming device and/or rendering module thereon identifies a graphical rendering having an award value matching the award value of the electronic ticket, the method proceeds to decision diamond 920.

At decision diamond 920, the gaming device and/or rendering module thereon compares the hardware profile associated with the identified graphical rendering to the hardware profile of the gaming device. In some embodiments, the hardware profile may include a model number identifying the specifications of the gaming device. For example, where the requesting gaming device is a venue-provided mobile tablet with a 4:3 screen aspect ratio, such as an 11" iPad with a resolution of 264 pixels/in (PPI), the hardware profile included in the request message may indicate an aspect ratio of 4:3, a screen size, a PPI, or any combination thereof.

When the hardware profile associated with the identified electronic ticket does NOT match the hardware profile of the gaming device, the method proceeds to step 914 where the gaming device and/or rendering module thereon determines NOT to select the graphical rendering. From step 914, the method then proceeds back to decision diamond 912 for consideration of the next graphical rendering in the sequential review.

When the gaming device and/or rendering module thereon determines that the identified graphical rendering has a hardware profile matching the hardware profile of the gaming device, the method proceeds to step 928.

In some embodiments, the gaming device and/or rendering module thereon only stores graphical renderings that have associated hardware profiles matching the hardware profile of the gaming device. In these embodiments, decision diamond 920 is not performed and instead the method proceeds from decision diamond 918 directly to step 928 upon identification of a graphical rendering having an award value matching the award value of the electronic ticket.

Returning now to step 922 (shown in FIG. 9C), where the gaming device and/or rendering module thereon has previously determined at decision diamond 910 that a selected electronic ticket includes an identifying code. At step 922, the gaming device and/or rendering module thereon identifies only and/or all graphical renderings associated with the identifying code of the electronic ticket and the method proceeds to decision diamond 924. In embodiments where the gaming device only stores graphical renderings that have associated hardware profiles matching the hardware profile of the gaming device, the gaming device and/or rendering module thereon will identify only one graphical rendering associated with the identifying code of the electronic ticket and the method proceeds directly to step 928.

At decision diamond 924, the gaming device and/or rendering module thereon reviews the identified graphical renderings associated with the identifying code of the electronic ticket to identify one or more graphical renderings corresponding to the hardware profile of the gaming device. This process may be performed sequentially, where the gaming device and/or rendering module thereon reviews each identified graphical rendering in turn and compares the hardware profile associated with that graphical rendering to the hardware profile of the gaming device.

In this sequential embodiment, when the gaming device finds that the hardware profiles do NOT match, the method proceeds to step 926 where the gaming device and/or rendering module thereon determines NOT to select the graphical rendering. From step 926, the method then proceeds back to decision diamond 924 for consideration of the next graphical rendering in the sequential review.

When the gaming device and/or rendering module thereon identifies a graphical rendering having a hardware profile matching the hardware profile of the gaming device, the method proceeds to step 928.

At step 928, the gaming device displays to the player the graphical rendering identified and the method terminates.

The system and method described above relate to the generation of intelligent electronic pull-tab tickets and distribution of such to various fixed and mobile gaming devices having disparate screen sizes and formats. Distribution of gaming sessions to, and reception by, mobile devices may additionally require funding of wagering activity on a software application, e.g., a mobile application, on a user's personal device. Many mechanisms are available for funding wagering activity using debit cards or credit cards, or other private account. The systems and methods described above allow the payment of cash by an anonymous user by defining an interaction between a user with a personal device and a POS device at a gaming venue or licensed venue to offer wagering on mobile devices.

It should be noted that in jurisdictions that allow gaming outside of physically licensed areas some of the above-mentioned security considerations may be relaxed or replaced by more appropriate mechanisms. It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A pull-tab gaming system comprising:

a network component that includes a ticket generation component, which generates a finite set of electronic pull-tab tickets, each ticket having a ticket identifier, an award value, and an identifying code associated with a ticket game theme, a ticket wager amount, and a ticket award value;

a rendering module associated with the network system, the rendering module including a database of graphical renderings, in which each graphical rendering is associated with the ticket game theme, the ticket award value, and a hardware profile;

the rendering module associating the identifying code of the ticket with one or more graphical renderings corresponding to a plurality of hardware profiles;

a plurality of gaming devices, in which each gaming device includes a hardware profile, a rendering module, and a rendering database that includes graphical renderings associated with identifying codes and hardware profiles;

wherein a first gaming device having a first hardware profile receives an electronic pull-tab ticket and its identifying code;

wherein the first gaming device rendering module selects a graphical rendering associated with the identifying code and the first hardware profile from the first gaming device rendering database, and displays the selected graphical rendering that includes the award value;

wherein a second gaming device having a second, different hardware profile receives an electronic pull-tab ticket with the same identifying code; and wherein the second gaming device rendering module selects a different graphical rendering associated with the identifying code and the second hardware profile from the second device rendering database, and displays the different graphical rendering and award value.

2. The pull-tab gaming system of claim 1, wherein each electronic pull-tab ticket includes a plurality of graphical renderings, in which each graphical rendering is associated with a hardware profile, and wherein the first gaming device rendering module selects a first graphical rendering associated with the first hardware profile, and the second gaming device rendering module selects a second graphical rendering associated with the second hardware profile.

3. The pull-tab gaming system of claim 1, wherein the network component selects a graphical rendering for the first gaming device based on the first hardware profile, and transmits the selected graphical rendering to the first gaming device; and the network component selects a graphical rendering for the second gaming device based on the second hardware profile, and transmits the selected graphical rendering to the second gaming device.

4. The pull-tab gaming system of claim 3, wherein each electronic pull-tab ticket includes a plurality of graphical rendering variants, including the graphical rendering variant transmitted to the first gaming device and the graphical rendering variant transmitted to the second gaming device, each graphical rendering variant associated with a respective hardware profile.

5. The pull-tab gaming system of claim 3, wherein the rendering module of the network component includes a plurality of graphical renderings, including the graphical rendering transmitted to the first gaming device and the graphical rendering transmitted to the second gaming device, each graphical rendering associated with a respective hardware profile.

6. The pull-tab gaming system of claim 1, wherein each gaming device rendering module includes a rendering database comprising graphical renderings associated with identifying codes and hardware profiles, including the graphical rendering displayed by the first gaming device and the graphical rendering displayed by the second gaming device.

7. The pull-tab gaming system of claim 6, wherein the network component determines the award value of each electronic pull-tab ticket, and each gaming device rendering module selects a graphical rendering for display based on the hardware profile of the respective gaming device.

8. The pull-tab gaming system of claim 1, wherein each electronic pull-tab ticket includes a deck identifier that associates the ticket with a specific deck of electronic pull-tab tickets.

9. The pull-tab gaming system of claim 1, wherein each gaming device hardware profile identifies a display configuration that includes a cabinet electronic gaming machine (EGM), a tablet, and a smartphone.

10. The pull-tab gaming system of claim 1, wherein the graphical rendering displayed by the first gaming device includes a first symbol grid in a 3×3 format, a second symbol grid in a 5×3 format, a landscape aspect ratio, and a portrait aspect ratio; and the graphical rendering displayed by the second gaming device includes a first symbol grid in a 3×3 format, a second symbol grid in a 5×3 format, a landscape aspect ratio, or a portrait aspect ratio.

11. A method for rendering electronic pull-tab tickets across multiple gaming device types, the method comprising:

generating, by a ticket generation component of a network component, a finite set of electronic pull-tab tickets, each electronic pull-tab ticket having a ticket identifier, an assigned award value, and an identifying code associated with a game theme and a wager amount;

associating, by a rendering module of the network component, each identifying code with one or more graphical renderings corresponding to different hardware profiles, each graphical rendering stored in a rendering database and associated with a game theme, an award value, and a hardware profile;

transmitting, by the network component, a first electronic pull-tab ticket and its identifying code to a first gaming device having a first hardware profile;

selecting, by a first gaming device rendering module, a graphical rendering from a local rendering database based on the identifying code and the first hardware profile;

displaying, by the first gaming device, the selected graphical rendering including the assigned award value;

transmitting, by the network component, a second electronic pull-tab ticket having the same identifying code to a second gaming device having a second, different hardware profile;

selecting, by a second gaming device rendering module, a different graphical rendering from a local rendering database based on the identifying code and the second hardware profile; and displaying, by the second gaming device, the different graphical rendering including the assigned award value.

12. The method of claim 11, wherein each electronic pull-tab ticket includes a plurality of graphical renderings, in which each graphical rendering is associated with a hardware profile, and wherein the first gaming device rendering module selects a first graphical rendering associated with the first hardware profile, and the second gaming device rendering module selects a second graphical rendering associated with the second hardware profile.

13. The method of claim 11, wherein the network component selects a graphical rendering for the first gaming device based on the first hardware profile, and transmits the selected graphical rendering to the first gaming device; and the network component selects a graphical rendering for the second gaming device based on the second hardware profile, and transmits the selected graphical rendering to the second gaming device.

14. The method of claim 13, wherein each electronic pull-tab ticket includes a plurality of graphical rendering variants, including the graphical rendering variant transmitted to the first gaming device and the graphical rendering variant transmitted to the second gaming device, each graphical rendering variant associated with a respective hardware profile.

15. The method of claim 13, wherein the rendering module of the network component includes a plurality of graphical renderings, including the graphical rendering transmitted to the first gaming device and the graphical rendering transmitted to the second gaming device, each graphical rendering associated with a respective hardware profile.

16. The method of claim 11, wherein each gaming device rendering module includes a rendering database comprising graphical renderings associated with identifying codes and hardware profiles, including the graphical rendering displayed by the first gaming device and the graphical rendering displayed by the second gaming device.

17. The method of claim 16, wherein the network component determines the award value of each electronic pull-tab ticket, and each gaming device rendering module selects a graphical rendering for display based on the hardware profile of the respective gaming device.

18. The method of claim 11, wherein each electronic pull-tab ticket includes a deck identifier that associates the ticket with a specific deck of electronic pull-tab tickets.

19. The method of claim 11, wherein each gaming device hardware profile identifies a display configuration that includes a cabinet electronic gaming machine (EGM), a tablet, and a smartphone.

20. The method of claim 11, wherein the graphical rendering displayed by the first gaming device includes a first symbol grid in a 3×3 format, a second symbol grid in a 5×3 format, a landscape aspect ratio, and a portrait aspect ratio; and the graphical rendering displayed by the second gaming device includes a first symbol grid in a 3×3 format, a second symbol grid in a 5×3 format, a landscape aspect ratio, or a portrait aspect ratio.

* * * * *